(12) United States Patent
Seo et al.

(10) Patent No.: US 11,586,015 B2
(45) Date of Patent: Feb. 21, 2023

(54) OPTICAL LENS ASSEMBLY AND ELECTRONIC DEVICE COMPRISING SAME

(71) Applicant: Samsung Electronics Co., Ltd., Gyeonggi-do (KR)

(72) Inventors: Jin-seon Seo, Gyeonggi-do (KR); Chang-keun Kim, Gyeonggi-do (KR); Sang-yong Jeon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 270 days.

(21) Appl. No.: 16/648,290

(22) PCT Filed: Aug. 20, 2018

(86) PCT No.: PCT/KR2018/009509
§ 371 (c)(1),
(2) Date: Mar. 18, 2020

(87) PCT Pub. No.: WO2019/066251
PCT Pub. Date: Apr. 4, 2019

(65) Prior Publication Data
US 2020/0218037 A1      Jul. 9, 2020

(30) Foreign Application Priority Data

Sep. 27, 2017   (KR) ........................ 10-2017-0125415

(51) Int. Cl.
*G02B 13/00* (2006.01)
*G02B 9/62* (2006.01)
*G03B 17/12* (2021.01)

(52) U.S. Cl.
CPC .......... *G02B 13/0045* (2013.01); *G02B 9/62* (2013.01); *G03B 17/12* (2013.01)

(58) Field of Classification Search
CPC ............. G02B 13/0045; G02B 13/002; G02B 13/0015; G02B 13/001; G02B 13/005; G02B 9/62; G02B 9/64; G03B 17/02
USPC ................ 359/756, 761, 714, 658, 613, 752
See application file for complete search history.

(56) References Cited

U.S. PATENT DOCUMENTS

| 9,377,605 | B2 | 6/2016 | Chung et al. |
| 9,488,809 | B2 | 11/2016 | Huang |
| 9,557,534 | B1 | 1/2017 | Liao et al. |
| 9,602,731 | B2 | 3/2017 | Lin et al. |

(Continued)

FOREIGN PATENT DOCUMENTS

| CN | 104516094 A | 4/2015 |
| CN | 1057176094 A | 4/2015 |

(Continued)

OTHER PUBLICATIONS

European Search Report dated Oct. 12, 2020.
(Continued)

*Primary Examiner* — Travis S Fissel
(74) *Attorney, Agent, or Firm* — Cha & Reiter, LLC

(57) ABSTRACT

The optical lens assembly may include a first lens having a negative refractive power, a second lens having a positive refractive power, a third lens having a negative refractive power, a fourth lens having a refractive power, a fifth lens having a refractive power, a sixth lens having a negative refractive power, and a stop disposed at an object side of the first lens.

13 Claims, 15 Drawing Sheets

(56) References Cited

U.S. PATENT DOCUMENTS

| | | | |
|---|---|---|---|
| 9,606,327 B2 | 3/2017 | Lin et al. | |
| 9,651,759 B2 | 5/2017 | Huang | |
| 10,054,766 B2 | 8/2018 | Shin et al. | |
| 10,606,040 B2 | 3/2020 | Hsu et al. | |
| 2011/0249349 A1* | 10/2011 | Asami | G02B 9/62 359/797 |
| 2013/0155511 A1 | 6/2013 | Peng et al. | |
| 2016/0065813 A1 | 3/2016 | Jo | |
| 2016/0161709 A1 | 6/2016 | Hsueh et al. | |
| 2017/0082833 A1 | 3/2017 | Huang | |
| 2017/0184812 A1 | 6/2017 | Yoon et al. | |
| 2017/0336604 A1 | 11/2017 | Hsu et al. | |

FOREIGN PATENT DOCUMENTS

| | | |
|---|---|---|
| CN | 105717609 A | 6/2016 |
| CN | 107402431 A | 6/2016 |
| CN | 106547070 A | 3/2017 |
| CN | 104516094 A | 11/2017 |
| CN | 107402431 A | 11/2017 |
| CN | 105717609 B * | 5/2018 |
| JP | 2014-44250 A | 3/2014 |
| JP | 2015-114505 A | 6/2015 |
| KR | 10-2016-0025868 A | 3/2016 |
| KR | 10-2016-0108080 A | 9/2016 |
| TW | I580999 B | 5/2017 |

OTHER PUBLICATIONS

Chinese Search Report dated Oct. 22, 2021.
Search Report dated Nov. 23, 2018.
Korean Search Report dated Jan. 21, 2022.
Smith; "Modern Optical Engineering, The Design of Optical Systems"; Jan. 1, 1990; McGraw-Hill, Inc.; XP055152063.
European Search Report dated Feb. 22, 2021.
Notice of Allowance dated Aug. 5, 2022.

* cited by examiner

OPTICAL LENS ASSEMBLY AND ELECTRONIC DEVICE COMPRISING SAME

CROSS REFERENCE TO RELATED APPLICATIONS

This application is a National Phase Entry of PCT International Application No. PCT/KR2018/009509, which was filed on Aug. 20, 2018, and claims a priority to Korean Patent Application No. 10-2017-0125415, which was filed on Sep. 27, 2017, the contents of which are incorporated herein by reference.

TECHNICAL FIELD

The disclosure relates to an optical lens assembly and an electronic apparatus including the optical lens assembly, and more particularly, to a compact optical lens assembly having a wide angle and an electronic apparatus including the compact optical lens assembly.

BACKGROUND ART

Various services and added functions provided by electronic apparatuses have gradually expanded. Electronic apparatuses, for example, mobile devices or user devices, may provide various services through various sensor modules. Also, the electronic apparatus may provide multimedia services, for example, photo services or video services. As use of electronic apparatuses increases, use of cameras operatively connected to an electronic apparatus has gradually increased. The performance and/or resolution of a camera of an electronic apparatus have been improved according to user demand. Images of various types of landscapes, portraits, or selfies may be captured by using a camera of an electronic apparatus. Such multimedia, for example, photos or videos, may be shared on a social network site or other media.

With the development of semiconductor and display technologies, various camera lenses for mobile devices have been developed ranging from a low resolution to a high resolution, from a small sensor format to a larger sensor format, for example from a ⅛" sensor to a ½" sensor, and from a telephoto lens to an ultra wide-angle lens.

DESCRIPTION OF EMBODIMENTS

Technical Problem

As imaging apparatuses are increasingly used in mobile devices, demand for miniaturization has increased. With an increase in front-side shot, demand for wide-angle lenses has increased.

Provided is a compact wide-angle optical lens assembly for electronic apparatuses, for example, mobile terminals.

Furthermore, provided is an electronic apparatus including, for example, a compact wide-view optical lens assembly.

Solution to Problem

To solve the above described object or another object, according to an embodiment of the disclosure, an optical lens assembly includes a plurality of lenses arranged from an object side to an image side includes a first lens having a negative refractive power, a second lens having a positive refractive power, a third lens having a negative refractive power, a fourth lens having a refractive power, a fifth lens having a refractive power, a sixth lens having a negative refractive power and disposed close to the image, and a stop disposed at an object side of the first lens, wherein the optical lens assembly satisfies the following inequalities:

$$0.2 < L1ape/L6ape < 0.4$$

$$-300 < f1/f < -5 \qquad \text{<Inequalities>}$$

wherein L1ape denotes an effective radius of an object side surface of the first lens, L6ape denotes an effective radius of an image side surface of the sixth lens, f1 denotes an effective focal length of the first lens, and f denotes a total focal length of the optical lens assembly.

To solve the above described object or another object, according to another embodiment of the disclosure, an optical lens assembly includes a plurality of lenses arranged from an object side to an image side includes a first lens having a negative refractive power, a second lens having a positive refractive power, a third lens having a negative refractive power, a fourth lens having a refractive power, a fifth lens having a refractive power, a sixth lens having a negative refractive power, and a stop disposed at an object side of the first lens, wherein the optical lens assembly satisfies the following inequalities:

$$0.2 < L1ape/L6ape < 0.4$$

$$-1 < R3/R4 < -0.3 \qquad \text{<Inequalities>}$$

wherein L1ape denotes an effective radius of an object side surface of the first lens, L6ape denotes an effective radius of an image side surface of the sixth lens, R3 denotes a radius of curvature of an object side surface of the second lens, and R4 denotes a radius of curvature of an image side surface of the second lens.

To solve the above described object or another object, according to another embodiment of the disclosure, an electronic apparatus includes an optical lens assembly and an image sensor configured to receive a light ray of an image formed by the optical lens assembly, wherein the optical lens assembly includes a first lens having a negative refractive power, a second lens having a positive refractive power, a third lens having a negative refractive power, a fourth lens having a refractive power, a fifth lens having a refractive power, a sixth lens having a negative refractive power, and a stop disposed at an object side of the first lens, which are arranged from an object side to an image side, wherein the optical lens assembly satisfies the following inequalities:

$$0.2 < L1ape/L6ape < 0.4$$

$$-300 < f1/f < -5 \qquad \text{<Inequalities>}$$

wherein L1ape denotes an effective radius of an object side surface of the first lens, L6ape denotes an effective radius of an image side surface of the sixth lens, f1 denotes an effective focal length of the first lens, and f denotes a total focal length of the optical lens assembly.

To solve the above described object or another object, according to another embodiment of the disclosure, an electronic apparatus includes an optical lens assembly, and an image sensor configured to receive a light ray of an image formed by the optical lens assembly, wherein the optical lens assembly including a plurality of lenses arranged from an object side to an image side may include a first lens having a negative refractive power, a second lens having a positive refractive power, a third lens having a negative refractive power, a fourth lens having a refractive power, a fifth lens having a refractive power, a sixth lens having a negative refractive power, and a stop disposed at an object side of the first lens, wherein the optical lens assembly satisfies the following inequalities:

$$0.2 < L1ape/L6ape < 0.4$$

$$-1 < R3/R4 < -0.3 \qquad \text{<Inequalities>}$$

wherein L1ape denotes an effective radius of an object side surface of the first lens, L6ape denotes an effective radius of an image side surface of the sixth lens, R3 denotes a radius of curvature of an object side surface of the second lens, and R4 denotes a radius of curvature of an image side surface of the second lens.

Advantageous Effects of Disclosure

An optical lens assembly according to various embodiments may be provided in a compact size and may be mounted in a mobile device. For example, the optical lens assembly is applied to a bezel-less mobile device so as to increase an effective screen size of a mobile device. As a stop is provided closest to an object side of the optical lens assembly, and a barrel entrance diameter size is reduced, the optical lens assembly may be applied suitably to a bezel-less structure.

Furthermore, as a radius of curvature of a lens surface included in the optical lens assembly is adjusted and configured to be aspherical, aberration may be effectively reduced and a high-resolution bright image may be obtained. Furthermore, as an arrangement interval between lenses and focal lengths are adjusted, a compact optical lens assembly with performance suitable for a wide angle lens may be implemented.

MODE OF DISCLOSURE

Figure 1:
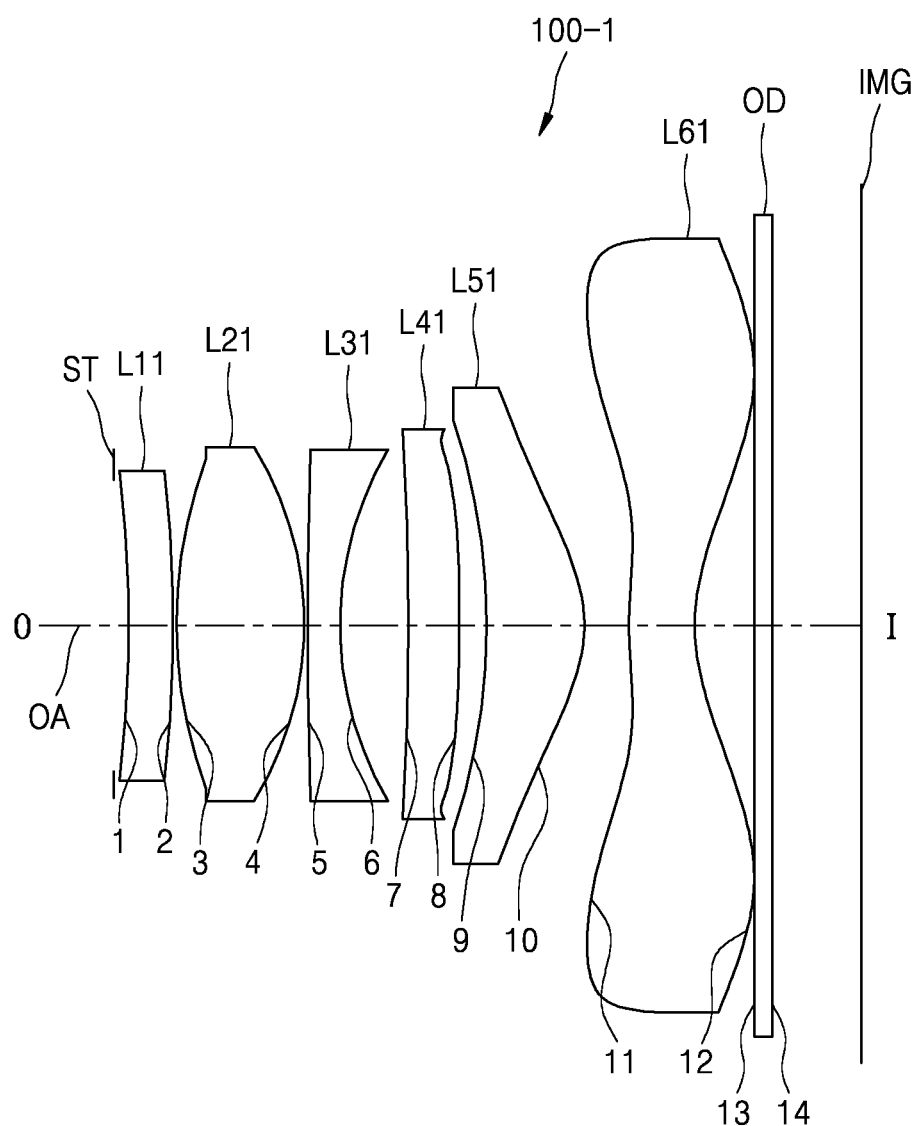
FIG. 1 illustrates of an optical lens assembly according to a first numerical embodiment from among various embodiments.

Hereinafter, various embodiments of the disclosure will be described with reference to the accompanying drawings. However, this is not intended to limit the disclosure to particular modes of practice, and it is to be appreciated that various modifications, equivalents, and/or alternatives that do not depart from the spirit and technical scope of the disclosure are encompassed in the disclosure. Throughout the drawings, like reference numerals denote like elements.

In the specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

In the specification, the expressions such as "A or B," "at least one of A and/or B," or "at least one or more of A and/or B" may include all available combinations of items listed together. For example, the expressions such as "A or B," "at least one of A and B," or "at least one of A or B" may signify all cases of (1) including at least one A, (2) including at least one B, or (3) including both of at least one A and at least one B.

Terms such as "first" and "second" are used herein merely to describe a variety of constituent elements, but the constituent elements are not limited by the terms. Such terms are used only for the purpose of distinguishing one constituent element from another constituent element. For example, a first user device and a second user device may denote different user devices regardless of order or importance. For example, without departing from the right scope of the disclosure, a first constituent element may be referred to as a second constituent element, and vice versa.

In the specification, when a constituent element, e.g., a first constituent element, is "(operatively or communicatively) coupled with/to" or is "connected to" another constituent element, e.g., a second constituent element, the constituent element contacts or is connected to the other constituent element directly or through at least one of other constituent elements, e.g., a third constituent element. Conversely, when a constituent element, e.g., a first constituent element, is described to "directly connect" or to be "directly connected" to another constituent element, e.g., a second constituent element, the constituent element should be construed to be directly connected to another constituent element without any other constituent element, e.g., a third constituent element, interposed therebetween.

In the specification, the expression "configured to" may be interchangeable with an expression such as "suitable for", "having the capacity to", "designed to", "adapted to", "made to", or "capable of". The expression "configured to" does not necessarily signify one that is "specifically designed to" in hardware. Instead, in some situations, the expression "configured to" may signify one that is "capable of" performing a function with other device or parts. For example, an expression "a processor configured to perform functions A, B, and C" may signify an exclusive processor, for example, an embedded processor, for performing the functions or a generic-purpose processor, for example, a CPU or an application processor, capable of performing the functions by executing one or more software programs stored in a memory device.

The terms used in the disclosure have been selected from currently widely used general terms in consideration of the functions in the disclosure. An expression used in a singular form in the specification also includes the expression in its plural form unless clearly specified otherwise in context. Unless defined otherwise, all terms used herein including technical or scientific terms have the same meanings as those generally understood by those of ordinary skill in the art to which the disclosure may pertain. The terms as those defined in generally used dictionaries are construed to have meanings matching that in the context of related technology and, unless clearly defined otherwise, are not construed to be ideally or excessively formal. As necessary, the terms used in the disclosure are defined based on their meanings in relation to the contents discussed throughout the specification, not by their simple meanings.

The term "electronic apparatus" according to various embodiments of the disclosure may include at least one of smartphones, tablet personal computers, mobile phones, video phones, e-book readers, desktop personal computers (PCs), laptop personal computers (PCs), netbook computers, workstations, servers, personal digital assistants (PDAs), portable multimedia players (PMPs), MP3 players, mobile medical devices, cameras, and wearable devices. According to various embodiments, a wearable device may include at least one of an accessory type, e.g., watches, rings, bracelets, anklets, necklaces, glasses, contact lenses, or head-mounted devices (HMD), a fabric or garment integrated type, e.g., electronic apparel, a body attached type, e.g., skin pads or tattoos, or a body implantable type, e.g., implantable circuits.

In various embodiments, the electronic apparatus may be home appliances. Home appliances may include at least one of, for example, televisions, digital video disk (DVD) players, audio systems, refrigerators, air conditioners, vacuum cleaners, ovens, microwaves, washing machines, air cleaners, set-top boxes, home automation control panels, security control panels, TV boxes such as Samsung's HomeSync™, Apple's TV™, or Google's TV™, game consoles such as Xbox™ or PlayStation™, electronic dictionaries, electronic keys, camcorders, and electronic photo frames.

In another embodiment, the electronic apparatus may include at least one of various medical devices such as various portable medical measuring instruments including a blood glucose meter, a heart rate meter, a blood pressure meter, or a temperature measuring instrument, magnetic resonance angiography (MRA), magnetic resonance imaging (MRI), computed tomography (CT), imaging apparatuses, or ultrasonic devices, navigation systems, global navigation satellite systems (GNSS), event data recorders (EDR), flight data recorders (FDR), automotive infotainment devices, marine electronic equipment such as a marine navigation system or a gyro compass, avionics, security devices, automobile head units, industrial or home robots, automotive teller's machines of financial institutions, points of sales (POS) of stores, and Internet of Things (IoT) devices such as light bulbs, various sensors, electric or gas meters, sprinkler devices, fire alarms, thermostats, street lights, toasters, exercise equipment, hot water tanks, heaters, boilers, etc.

In various embodiments, the electronic apparatus may include at least one of a part of furniture or a building/structure, an electronic board, an electronic signature receiving device, a projector, and a variety of measuring instruments, such as, a water, electricity, gas, or radio wave measuring instrument, etc. In various embodiments, the electronic apparatus may be one of the above-described devices and a combination thereof. In various embodiments, the electronic apparatus may be a flexible electronic apparatus. Furthermore, the electronic apparatus according to the present embodiment is not limited to the above-described devices, and may include a new electronic apparatus according to the development of technologies.

Hereinafter, an electronic apparatus according to various embodiments is described below in detail with reference to the accompanying drawings. In the specification, the term "user" may indicate a user who uses the electronic apparatus or an apparatus that uses the electronic apparatus, for example, an artificial intelligent electronic apparatus.

Hereinafter, an optical lens assembly according to various embodiments, and an apparatus having the same, are described below in detail with reference to the accompanying drawings.

FIG. 1 illustrates of an optical lens assembly 100-1 according to a first numerical embodiment from among various embodiments.

The optical lens assembly 100-1 according to various embodiments may include a first lens L11 having a negative refractive power, a second lens L21 having a positive refractive power, a third lens L31 having a negative refractive power, a fourth lens L41 having a refractive power, a fifth lens L51 having a refractive power, and a sixth lens L61 having a negative refractive power and disposed close to an image, which are arranged from an object side O to an image side I.

In the below description of a configuration of each lens, an image side may denote a direction toward, for example, an image plane IMG on which an image is formed, and an object side may denote a direction toward an object. Furthermore, an "object side surface" of a lens may denote, for example, the left surface on a drawing sheet, that is, a lens surface at a side where an object is located with respect to an optical axis OA, and an "image side surface" may denote the right surface, that is, a lens surface at a side where an image plane is located with respect to the OA. The image plane IMG may be, for example, an imaging device surface or an image sensor surface. The image sensor may include, for example, a sensor such as a complementary metal oxide semiconductor (CMOS) image sensor or a charge coupled device (CCD). The image sensor is not limited thereto, and may be, for example, a device that converts an image of an object to an electrical image signal.

The first lens L11 may have, for example, a shape concave toward the object side O. The first lens L11 may have, for example, a meniscus shape concave toward the object side O. The second lens L21 may have, for example, a shape convex toward the object side O. The second lens L21 may be, for example, a biconvex lens. The third lens L31 may have, for example, a shape concave toward the image side I. The third lens L31 may have a meniscus shape concave toward the image side I.

A fourth lens L41 may have, for example, a positive refractive power. The fourth lens L41 may have a shape concave toward the object side O. The fourth lens L41 may have, for example, a meniscus shape concave toward the object side O. The fifth lens L51 may have a positive refractive power. The fifth lens L51 may have, for example, a shape concave toward the object side O. The fifth lens L51 may have a meniscus shape concave toward the object side O. The sixth lens L61 may have at least one inflection point at at least one of the object side surface and the image side surface.

For example, the sixth lens L61 may have a meniscus shape convex toward the object side O in an area around the optical axis OA. The area around the optical axis may indicate an area within a certain radial range from the optical axis O, for example, the initial inflection point position. The inflection point may indicate, for example, a point at which the sign of a radius of curvature changes from (+) to (−) or from (−) to (+). Alternatively, the inflection point may indicate, for example, a point at which the shape of a lens changes from convex to concave or from concave to convex. The radius of curvature may indicate, for example, a value indicating a degree of curvature at each point of a curved surface or curved line. In the object side surface of the sixth lens L61, a lens center portion may be concave toward the object side O and a lens peripheral portion may be concave toward the object side O.

A stop ST may be provided at the object side O of the first lens L11. The stop ST for adjusting the diameter of a beam may include, for example, an aperture stop, a variable stop, or a mask type stop.

According to various embodiments, at least one optical device (OD) may be provided between the sixth lens L61 and the image plane IMG. The optical device (OD) may include, for example, at least one of a low pass filter, an infrared-cut (IR) filter, or a cover glass. For example, when an infrared-cut filter is provided as an optical device, visible rays may be transmitted, and infrared rays may be emitted to the outside and may not be transmitted to the image plane. However, an optical lens assembly may be configured without an optical device.

An optical lens assembly according to various embodiments may include at least one aspherical lens. For example of various embodiments, each of a first lens, a second lens, a third lens, a fourth lens, a fifth lens, and a sixth lens of the optical lens assembly may be an aspherical lens. For example, each of the first lens, the second lens, the third lens, the fourth lens, and the sixth lens may be a bi-aspherical lens, whereas the fifth lens may be a mono-aspherical lens. In the fifth lens, either an object side surface or an image side surface may be spherical.

An optical lens assembly according to various embodiments may include at least one plastic lens. For example, each of the first lens, the second lens, the third lens, the fourth lens, the fifth lens, and the sixth lens of the optical lens assembly according to various embodiments may be a plastic lens. As all lenses included in the optical lens assembly according to various embodiments are configured with plastic lenses, manufacturing costs may be reduced.

Figure 3:
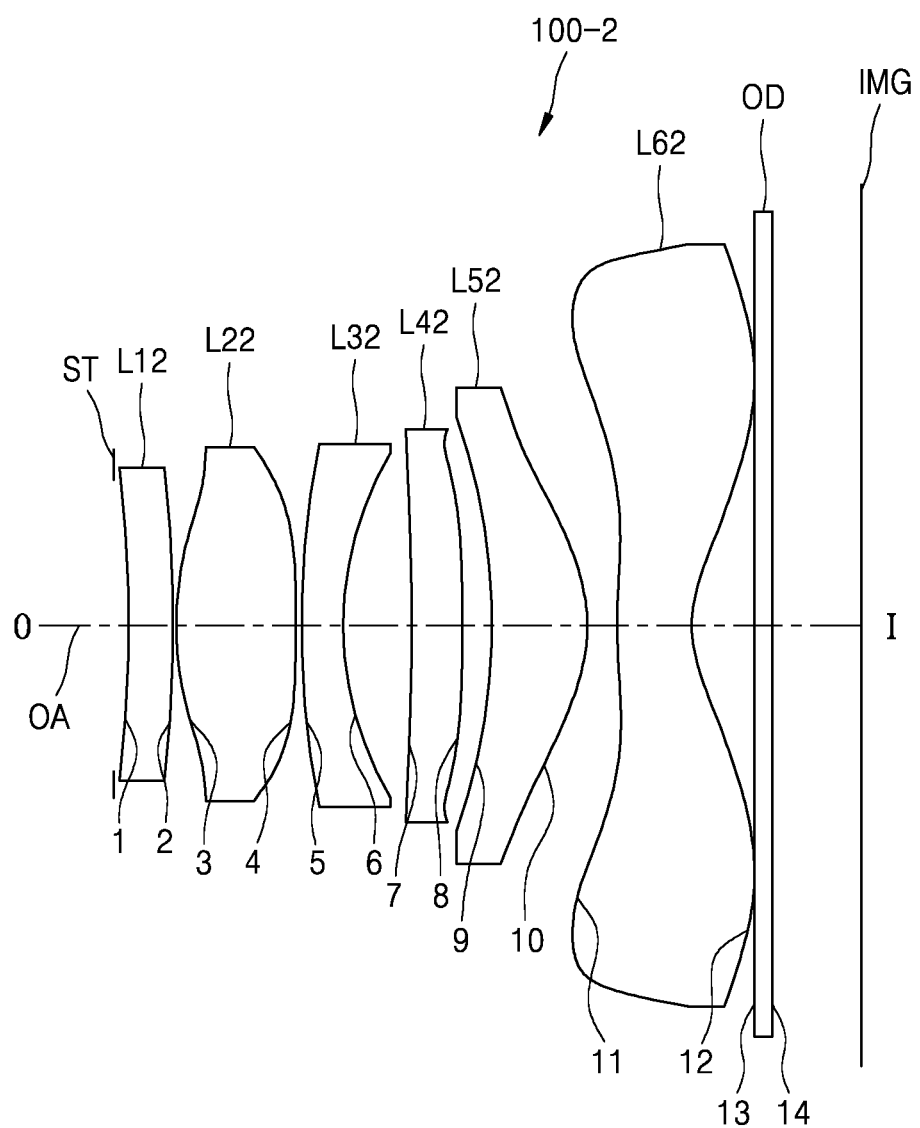
FIG. 3 illustrates an optical lens assembly according to a second numerical embodiment from among various embodiments.

FIG. 3 illustrates an optical lens assembly 100-2 according to a second numerical embodiment from among various embodiments. In connection with the optical lens assembly 100-2 according to the second numerical embodiment, a detailed description about the same portion as the optical lens assembly 100-1 described with reference to FIG. 1 is omitted.

The optical lens assembly 100-2 may include a first lens L12 having a negative refractive power, a second lens L22 having a positive refractive power, a third lens L32 having a negative refractive power, a fourth lens L42 having a positive refractive power, a fifth lens L52 having a positive refractive power, and a power sixth lens L62 having a negative refractive, which are sequentially arranged from the object side O to the image side I.

Figure 5:
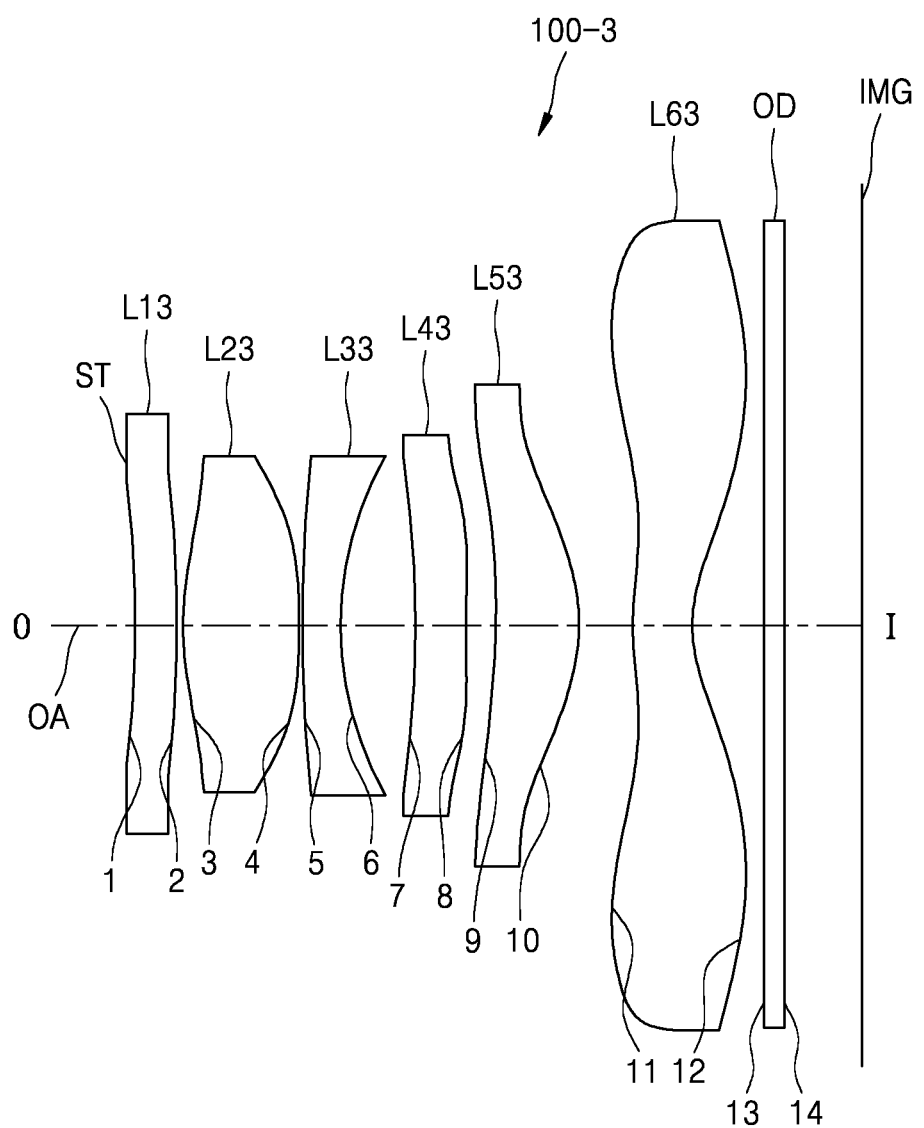
FIG. 5 illustrates an optical lens assembly according to a third numerical embodiment from among various embodiments.

FIG. 5 illustrates an optical lens assembly 100-3 according to a third numerical embodiment from among various embodiments.

The optical lens assembly 100-3 may include having a first lens L13 having a negative refractive power, a second lens L23 having a positive refractive power, a third lens L33 having a negative refractive power, a fourth lens L43 having a negative refractive power, a fifth lens L53 having a positive refractive power, and a sixth lens L63 having a negative refractive power, which are arranged from the object side O to the image side I. The fourth lens L43 may have a meniscus shape convex toward the object side O in the area around the optical axis.

Figure 7:
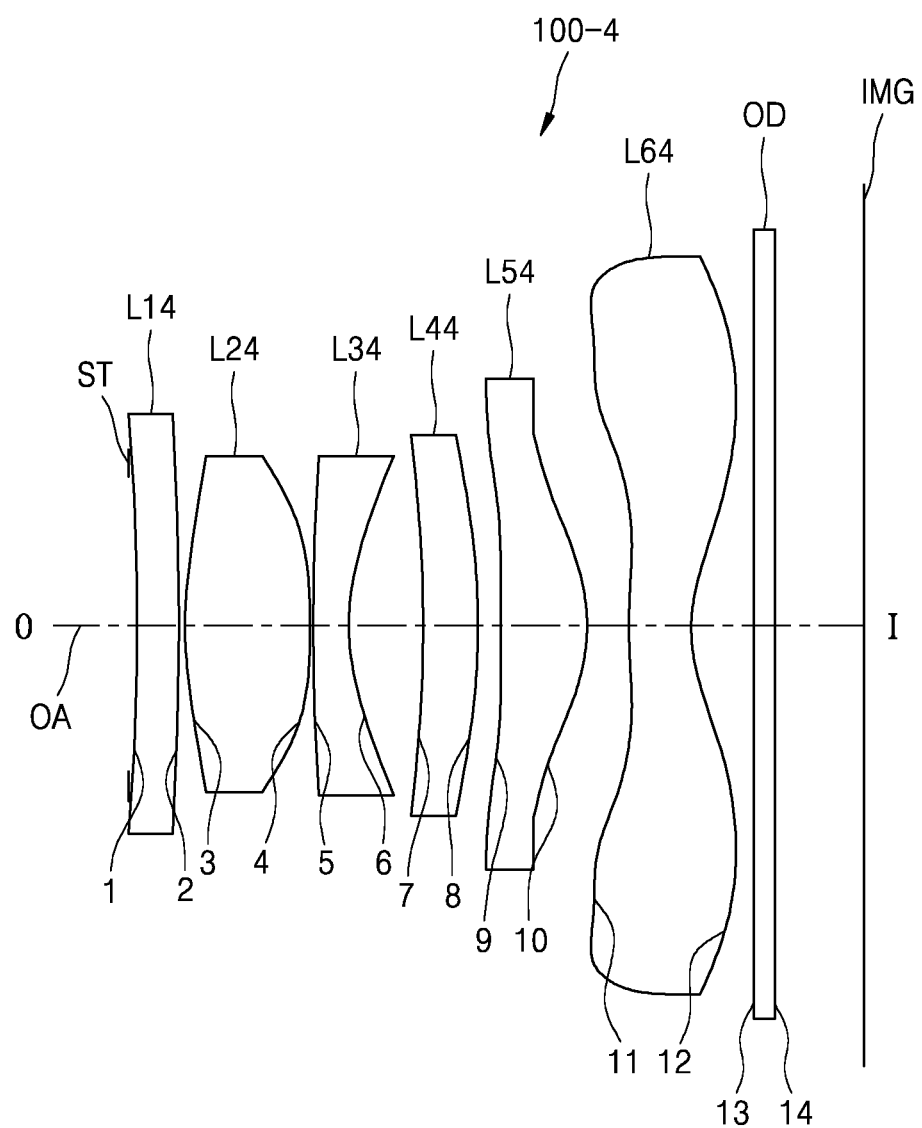
FIG. 7 illustrates an optical lens assembly according to a fourth numerical embodiment from among various embodiments.

FIG. 7 illustrates an optical lens assembly 100-4 according to a fourth numerical embodiment from among various embodiments.

The optical lens assembly 100-4 may include a first lens L14 having a negative refractive power, a second lens L24 having a positive refractive power, a third lens L34 having a negative refractive power, a fourth lens L44 having a negative refractive power, a fifth lens L54 having a positive refractive power, and a sixth lens L64 having a negative refractive power, which are arranged from the object side O to the image side I.

Figure 9:
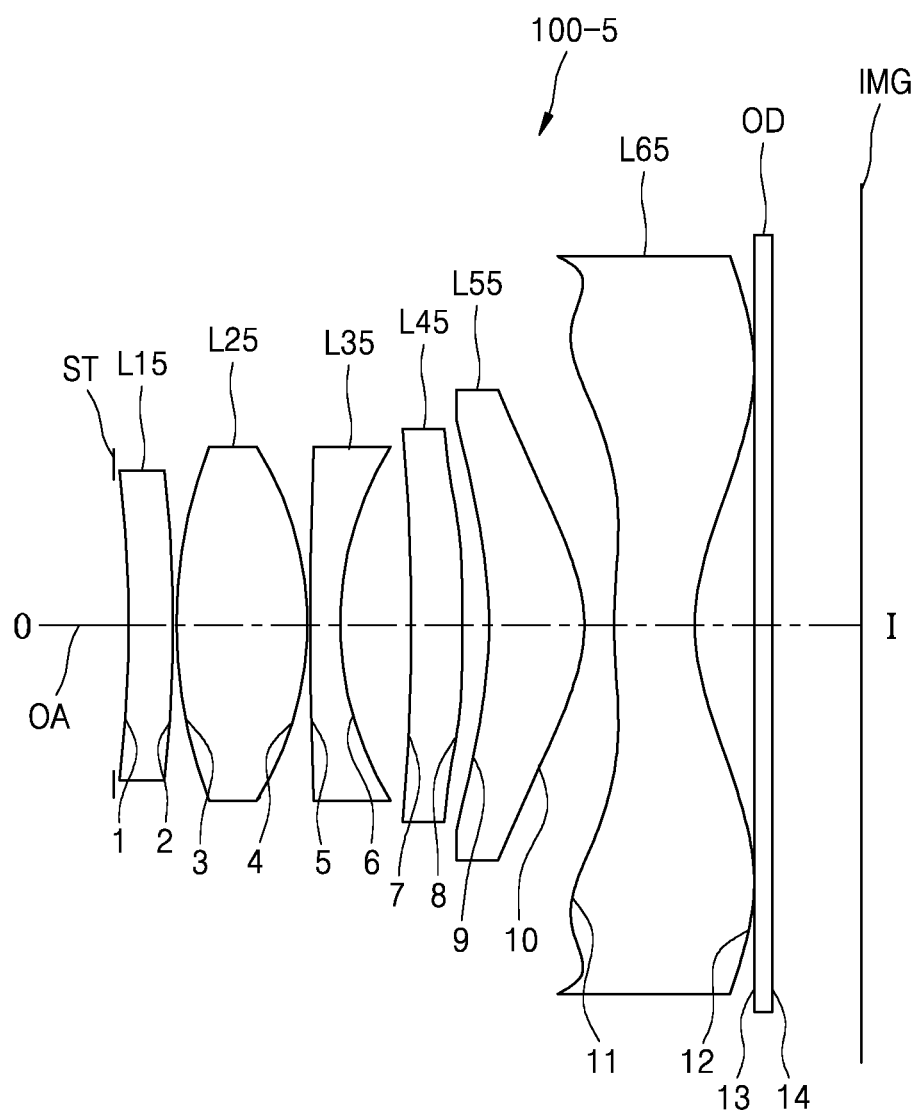
FIG. 9 illustrates an optical lens assembly according to a fifth numerical embodiment from among various embodiments.

FIG. 9 illustrates an optical lens assembly 100-5 according to a fifth numerical embodiment from among various embodiments.

The optical lens assembly 100-5 may include a first lens L15 having a negative refractive power, a second lens L25 having a positive refractive power, a third lens L35 having a negative refractive power, a fourth lens L45 having a positive refractive power, a fifth lens L55 having a positive refractive power, and a sixth lens L65 having a negative refractive power, which are arranged from the object side O to the image side I.

Figure 11:
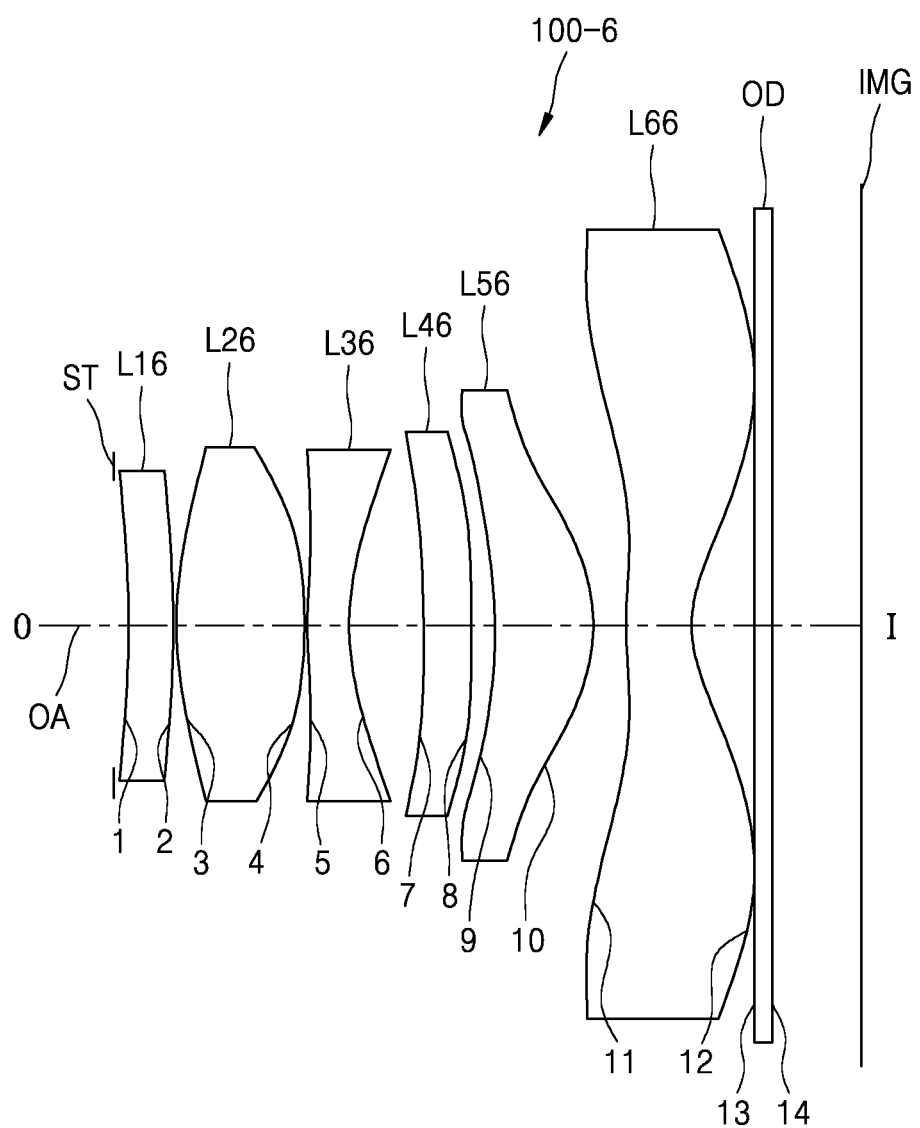
FIG. 11 illustrates an optical lens assembly according to a sixth numerical embodiment from among various embodiments.

FIG. 11 illustrates an optical lens assembly 100-6 according to a sixth numerical embodiment from among various embodiments.

The optical lens assembly 10065 may include a first lens L16 having a negative refractive power, a second lens L26 having a positive refractive power, a third lens L36 having a negative refractive power, a fourth lens L46 having a positive refractive power, a fifth lens L56 having a positive refractive power, and a sixth lens L66 having a negative refractive power, which are arranged from the object side O to the image side I.

An optical lens assembly according to various embodiments may satisfy the following inequalities. The following inequalities are described with reference to the optical lens assembly 100-1 according to the first numerical embodiment illustrated in FIG. 1. However, this may be applied to other embodiments.

$$0.2 < L1ape/L6ape < 0.4 \qquad \text{<Inequality 1>}$$

$$-300 < f1/f < -5 \qquad \text{<Inequality 2>}$$

Here, L1ape denotes the effective radius of the object side surface of the first lens L11, L6ape denotes the effective radius of the image side surface of the sixth lens, f1 denotes the effective focal length of the first lens, f denotes the total focal length of the optical lens assembly.

Inequality1 defines a ratio between the effective radius of the object side surface of the first lens L11 and the effective radius of the image side surface of the sixth lens L61. When (L1ape/L6ape) exceeds an upper limit value of Inequality1, the effective radius of the first lens L11 increases so as to be difficult to implement bezel-less structure, and when (L1ape/L6ape) is less than a lower limit value thereof, the implementation of a wide angle and a bright lens may be limited.

When (f1/f) is greater than the upper limit value in Inequality2, it may be difficult to satisfy a wide angle, and when (f1/f) is less than the lower limit value, a refractive power of the first lens decreases so that it may be disadvantageous to reduce the total length and difficult to secure optical performance.

An optical lens assembly according to various embodiments may satisfy the following inequalities.

$$1.4 < f/EPD < 1.9 \qquad \text{<Inequality 3>}$$

$$75 < FOV < 95 \qquad \text{<Inequality 4>}$$

Here, EPD denotes the entrance pupil, f denotes the total focal length of the optical lens assembly, and FOV denotes the field of view of the optical lens assembly.

When Inequality3 is satisfied, a bright lens may be implemented. An optical lens assembly according to various embodiments may implement a wide angle having a field of view in a range of 75-95 degrees.

An optical lens assembly according to various embodiments may satisfy the following inequalities.

$$30 < v2 - v3 < 40 \qquad \text{<Inequality 5>}$$

Here, v2 denotes the Abbe number of the second lens, and v3 denotes the Abbe number of the third lens.

When Inequality 5 is satisfied, chromatic aberration may be effectively reduced.

An optical lens assembly according to various embodiments may satisfy the following inequalities.

$$0.02 < CT3/OAL < 0.06 \qquad \text{<Inequality 6>}$$

$$0.08 < CT5/OAL < 0.15 \qquad \text{<Inequality 7>}$$

Here, CT3 denotes the thickness of the third lens L31 on the optical axis, OAL denotes the total length of the optical lens assembly 100-1, and CT5 denote the thickness of the fifth lens L51 on the optical axis. The total length of an optical lens assembly may mean a length from object side surface to the image plane (IMG) of the first lens L11.

When CT3/OAL and CT5/OAL are less than the lower limit values of Inequality 6 and Inequality 7, the thicknesses of the third lens and the fifth lens are too thin so that manufacturing lenses may be difficult, and when CT3/OAL and CT5/OAL is greater than the upper limit value, it may be disadvantageous to make a thin optical lens assembly. Furthermore, when CT3/OAL is greater than the upper limit value of Inequality 6, flare may be generated.

An optical lens assembly according to various embodiments may satisfy the following inequalities.

$$1 < R3/R4 < -0.3 \qquad \text{<Inequality 8>}$$

Here, R3 denotes the radius of curvature of the object side surface of the second lens, and R4 denotes the radius of curvature of the image side surface of the second lens.

Inequality 6 defines a ratio between the radius of curvature of the object side surface of the second lens and the radius of curvature of the image side surface of the second lens, and when Inequality 6 is satisfied, flare may be effectively reduced.

Meanwhile, in an optical lens assembly according to various embodiments, an air gap between the first lens L11 and the second lens L21 may be greater than 0 and less than or equal to 0.1 mm. Furthermore, an air gap between the second lens L21 and the third lens L31 may be greater than 0 and less than or equal to 0.1 mm. The optical lens assembly may be made thin by reducing the air gap between lenses.

An optical lens assembly according to various embodiments may have a wide angle of 75 degrees or higher and provide a bright optical system lens. A stop is disposed closest to the object side of the optical lens assembly, and bezel-less may be implemented by reducing the effective radius of the first lens.

Meanwhile, an aspherical surface used in an optical lens assembly according to various embodiments is defined below.

An aspherical shape may be expressed by the following equation on an assumption that an optical axis direction is an x-axis, a direction perpendicular to the optical axis direction is a y-axis, and a light ray proceeding direction is positive. Here, x denotes a distance from the apex of a lens in the optical axis direction, y denotes a distance in a direction perpendicular to the optical axis, K denotes a conic constant, A, B, C, and D denote aspherical coefficients, and c denotes a reciprocal (1/R) of a radius of curvature in the apex of a lens.

$$x = \frac{cy^2}{1 + \sqrt{1 - (K+1)c^2 y^2}} + Ay^4 + By^6 + Cy^8 + Dy^{10} + \ldots \qquad \text{<Inequality 9>}$$

In the present disclosure, an optical lens assembly may be implemented through numerical embodiments according to various designs below.

In each numerical embodiment, lens surface numbers (1, 2, 3 . . . n; where n is a natural number) are sequentially assigned in line from the object side O to the image side I. f denotes the focal length of an optical lens assembly, R denotes the radius of curvature, Dn denotes the thickness of a lens or an air gap between lenses, nd denotes a refractive index, vd denotes the Abbe number. ST denotes a stop, and IMG denotes an image plane. * denotes an aspherical surface.

First Numerical Embodiment

FIG. 1 illustrates of the optical lens assembly 100-1 according to the first numerical embodiment from among various embodiments, and Table 1 shows, for example, design data of the first numerical embodiment.

In the optical lens assembly 100-1 of the first numerical embodiment, an F-number is 1.77, a half field of view is 39.9°, and a focal length f is 2.935 mm.

TABLE 1

| Lens Surface | R | Dn | nd | vd |
|---|---|---|---|---|
| ST | infinity | 0.08000 | | |
| 1* | infinity | 0.25000 | 1.65038 | 21.52 |
| 2* | 36.5180 | 0.02500 | | |

TABLE 1-continued

| Lens Surface | R | Dn | nd | vd |
|---|---|---|---|---|
| 3* | 1.8800 | 0.72947 | 1.5441 | 56.09 |
| 4* | −2.1552 | 0.02000 | | |
| 5* | 3.2150 | 0.18000 | 1.65038 | 21.52 |
| 6* | 1.2091 | 0.40019 | | |
| 7* | −100.0000 | 0.28973 | 1.65038 | 21.52 |
| 8* | −24.6181 | 0.15931 | | |
| 9 | −3.5715 | 0.54500 | 1.5348 | 55.71 |
| 10* | −0.9790 | 0.24997 | | |
| 11* | 3.0434 | 0.39012 | 1.5441 | 56.09 |
| 12* | 0.8054 | 0.32620 | | |
| 13 | infinity | 0.11000 | 1.5168 | 64.2 |
| 14 | infinity | 0.49999 | | |
| IMG | infinity | | | |

Table 2 shows aspherical coefficients in the first numerical embodiment.

TABLE 2

| | Lens Surface | | | | |
|---|---|---|---|---|---|
| | 1 | 2 | 3 | 4 | 5 |
| K | 0.000000 | 0.000000 | −8.710805 | −60.741292 | −7.983587 |
| A | −0.152010 | −0.801904 | −0.588696 | −0.434831 | −0.212419 |
| B | −0.295618 | 4.040848 | 4.035398 | 0.620490 | −1.230995 |
| C | 3.667546 | −15.745230 | −15.912294 | −0.216093 | 7.039300 |
| D | −17.507979 | 45.026184 | 42.808926 | −2.200851 | −18.586252 |
| E | 49.858368 | −89.456310 | −78.742584 | 7.013876 | 30.752132 |
| F | −86.887113 | 120.414215 | 96.550925 | −11.024323 | −33.051570 |
| G | 90.827130 | −104.561342 | −75.206307 | 9.850996 | 22.299761 |
| H | −52.319427 | 52.766692 | 33.568708 | −4.752820 | −8.534529 |
| J | 12.755691 | −11.743754 | −6.576702 | 0.960809 | 1.409410 |

| | Lens Surface | | | | |
|---|---|---|---|---|---|
| | 6 | 7 | 8 | 10 | 11 | 12 |
| K | −6.745827 | 225.406284 | 92.656417 | −6.049507 | 0.401606 | −3.831134 |
| A | −0.032776 | −0.038040 | −0.073569 | −0.378117 | −0.309810 | −0.205935 |
| B | −0.190268 | −0.126573 | −0.176189 | 1.037453 | 0.091516 | 0.169506 |
| C | 0.880698 | 0.259696 | 0.993979 | −2.328884 | 0.138452 | −0.097757 |
| D | −0.600135 | −0.396589 | −3.544890 | 3.872309 | −0.219011 | 0.037479 |
| E | −2.173560 | 0.472446 | 7.449524 | −4.199768 | 0.148161 | −0.009586 |
| F | 5.808451 | −0.203912 | −9.461351 | 2.902997 | −0.055931 | 0.001590 |
| G | −6.308927 | 0.000000 | 7.249042 | −1.241756 | 0.012165 | −0.000161 |
| H | 3.358196 | 0.000000 | −3.049947 | 0.300667 | −0.001430 | 0.000009 |
| J | −0.712967 | 0.000000 | 0.536233 | −0.031600 | 0.000070 | 0.000000 |

Figure 2:
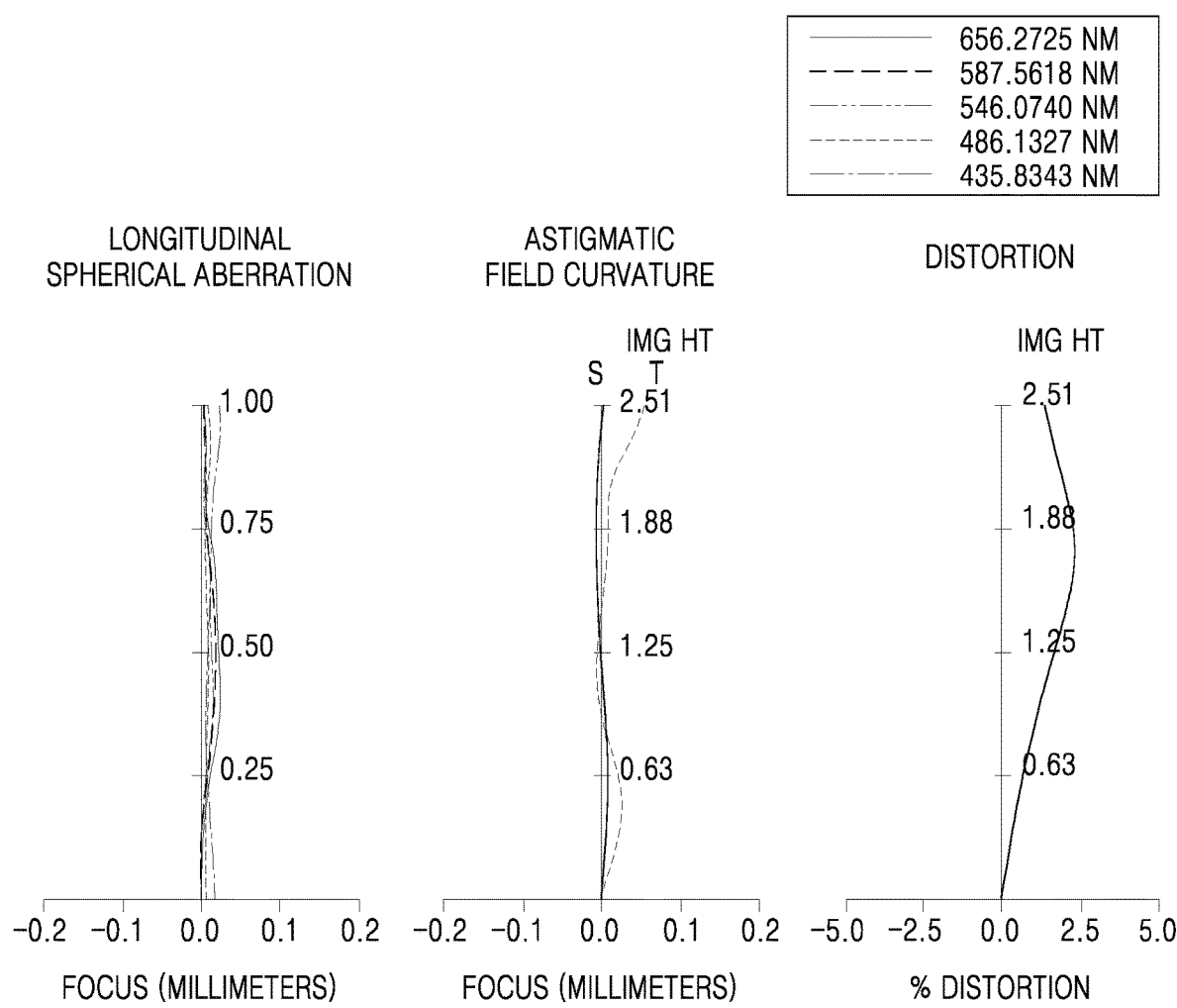
FIG. 2 is an aberration diagram of the optical lens assembly according to the first numerical embodiment from among various embodiments.

FIG. 2 illustrates the longitudinal spherical aberration, astigmatic field curves, and distortion of the optical lens assembly according to the first numerical embodiment. The longitudinal spherical aberration occurs in each of light rays having wavelengths of, for example, 656.2725 nanometers (NM), 587.5618 NM, 546.0740 NM, 486.1327 NM, and 435.8343 NM, and the astigmatic field curves includes a tangential field curvature (T) and a sagittal field curvature (S). The astigmatic field curves are shown with respect to a light ray having a wavelength of 587.5618 NM, and the distortion is shown with respect to a light ray having a wavelength of 587.5618 NM. In the drawing, IMG HT denotes the image height, for example, the half diagonal length of an image sensor.

Second Numerical Embodiment

FIG. 3 illustrates the optical lens assembly 100-2 according to the second numerical embodiment from among various embodiments, and Table 3 shows, for example, design data of the second numerical embodiment.

In the second numerical embodiment, an F-number is 1.76, a half field of view is 40°, and a focal length f is 2.92 mm.

TABLE 3

| Lens Surface | R | Dn | nd | vd |
|---|---|---|---|---|
| ST | infinity | 0.08 | | |
| 1* | infinity | 0.25 | 1.65038 | 21.52 |
| 2* | 11.871 | 0.025 | | |
| 3* | 1.88 | 0.684 | 1.5441 | 56.09 |
| 4* | −3.397 | 0.02 | | |
| 5* | 2.229 | 0.235 | 1.65038 | 21.52 |
| 6* | 1.345 | 0.406 | | |
| 7* | −100 | 0.288 | 1.5348 | 55.71 |

TABLE 3-continued

| Lens Surface | R | Dn | nd | vd |
|---|---|---|---|---|
| 8* | −15.605 | 0.165 | | |
| 9 | −3.529 | 0.545 | 1.5348 | 55.71 |
| 10* | −0.995 | 0.162 | | |
| 11* | 2.748 | 0.441 | 1.5441 | 56.09 |
| 12* | 0.755 | 0.343 | | |
| 13 | infinity | 0.11 | 1.5168 | 64.2 |
| 14 | infinity | 0.5 | | |
| IMG | infinity | 0 | | |

Table 4 shows aspherical coefficients in the second numerical embodiment.

TABLE 4

| | Lens Surface | | | | |
|---|---|---|---|---|---|
| | 1 | 2 | 3 | 4 | 5 |
| K | 0.000000 | 0.000000 | −6.834770 | −60.742668 | −4.028693 |
| A | −0.168830 | −0.537680 | −0.277018 | 0.094008 | 0.027270 |
| B | −0.025093 | 2.355644 | 2.207779 | −1.907383 | −1.438045 |
| C | 1.954894 | −9.120138 | −9.247739 | 7.413528 | 4.326168 |
| D | −11.310951 | 24.802521 | 24.641059 | −18.556775 | −8.190988 |
| E | 34.871959 | −45.327891 | −43.721315 | 31.300432 | 12.045870 |
| F | −63.330397 | 55.533425 | 51.317366 | −34.861801 | −12.826537 |
| G | 68.101935 | −44.006145 | −38.317001 | 24.368027 | 8.720646 |
| H | −40.204345 | 20.467785 | 16.456376 | −9.658497 | −3.282724 |
| J | 10.059709 | −4.235641 | −3.085670 | 1.654932 | 0.513659 |

| | Lens Surface | | | | | |
|---|---|---|---|---|---|---|
| | 6 | 7 | 8 | 10 | 11 | 12 |
| K | −5.336053 | 225.406284 | 92.639098 | −5.873660 | 0.374685 | −4.326594 |
| A | 0.067509 | −0.074986 | −0.093236 | −0.296708 | −0.439902 | −0.168163 |
| B | −0.069674 | 0.045053 | −0.102438 | 0.583599 | 0.426314 | 0.134445 |
| C | −1.229503 | 0.083256 | 0.800250 | −0.743778 | −0.374229 | −0.079281 |
| D | 5.575564 | −0.467455 | −2.350296 | 0.563065 | 0.241175 | 0.031353 |
| E | −11.461776 | 0.645852 | 4.021298 | −0.107014 | −0.102357 | −0.008142 |
| F | 14.282074 | −0.264700 | −4.424502 | −0.155326 | 0.028256 | 0.001342 |
| G | −11.157295 | 0.000000 | 3.109982 | 0.125940 | −0.004959 | −0.000133 |
| H | 5.002858 | 0.000000 | −1.225687 | −0.038495 | 0.000505 | 0.000007 |
| J | −0.972556 | 0.000000 | 0.200600 | 0.004431 | −0.000023 | 0.000000 |

Figure 4:
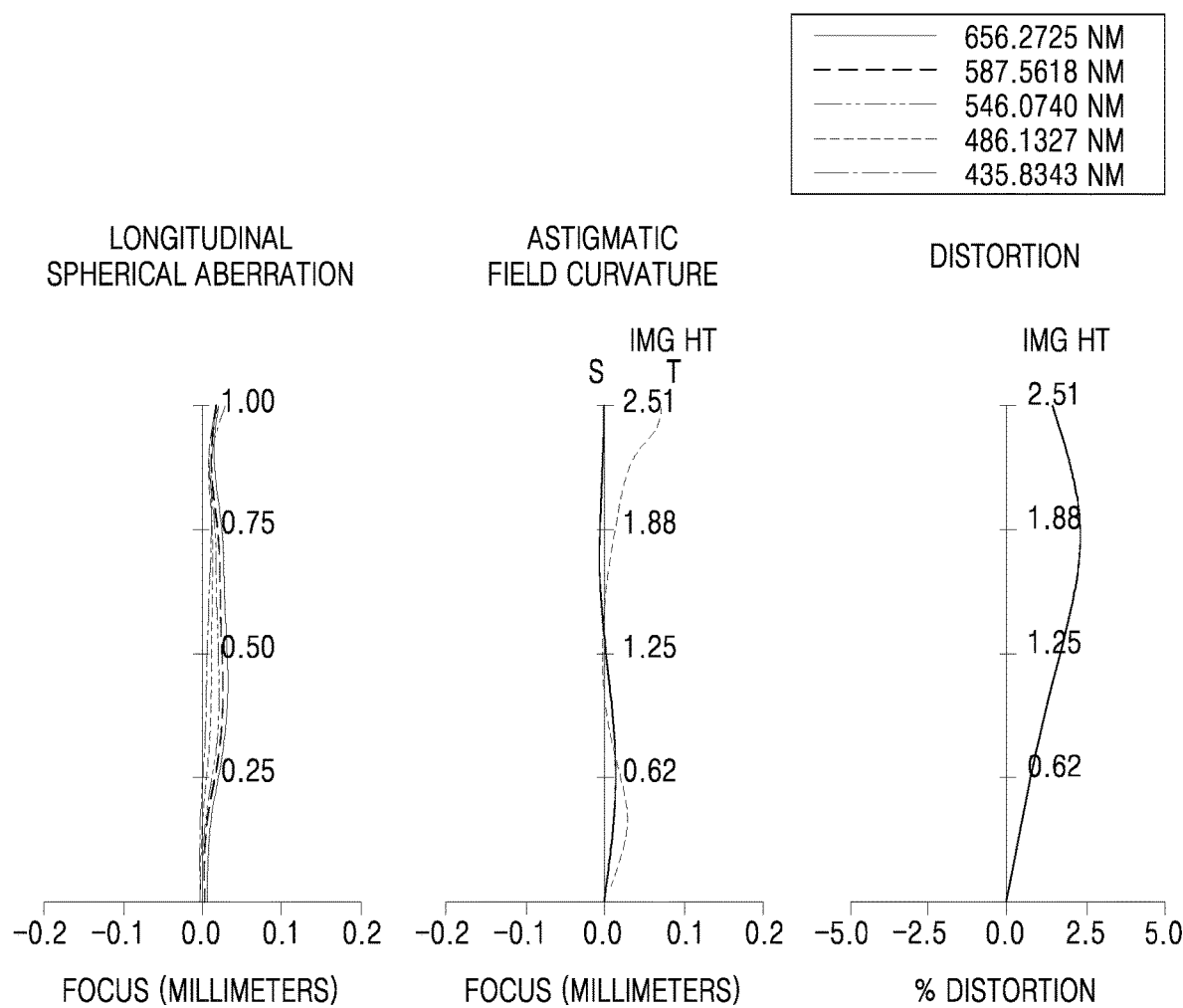
FIG. 4 is an aberration diagram of the optical lens assembly according to the second numerical embodiment from among various embodiments.

FIG. 4 illustrates the longitudinal spherical aberration, astigmatic field curves, and distortion of the optical lens assembly 100-2 according to the second numerical embodiment.

Third Numerical Embodiment

FIG. 5 illustrates the optical lens assembly 100-3 according to the third numerical embodiment from among various embodiments, and Table 5 shows, for example, design data of the third numerical embodiment.

In the third numerical embodiment, an F-number is 1.76, a half field of view is 39.8°, and an effective focal length F of an overall lens system is 2.95 mm.

TABLE 5

| Lens Surface | R | Dn | nd | vd |
|---|---|---|---|---|
| ST | infinity | 0.05 | | |
| 1* | infinity | 0.25 | 1.6504 | 21.47 |

TABLE 5-continued

| Lens Surface | R | Dn | nd | vd |
|---|---|---|---|---|
| 2* | 23.652 | 0.025 | | |
| 3* | 1.9 | 0.664 | 1.54401 | 55.91 |
| 4* | −2.8 | 0.025 | | |
| 5* | 2.819 | 0.21 | 1.6504 | 21.47 |
| 6* | 1.269 | 0.424 | | |
| 7* | 37.501 | 0.301 | 1.61444 | 25.94 |
| 8* | 21.478 | 0.159 | | |
| 9 | −6.593 | 0.489 | 1.54401 | 55.91 |
| 10* | −1.065 | 0.301 | | |
| 11* | 2.461 | 0.34 | 1.5348 | 55.71 |
| 12* | 0.775 | 0.412 | | |
| 13 | infinity | 0.11 | 1.5168 | 64.2 |
| 14 | infinity | 0.45 | | |
| IMG | infinity | 0 | | |

Table 6 shows aspherical coefficients in the third numerical embodiment.

TABLE 6

| | Lens Surface | | | | | |
|---|---|---|---|---|---|---|
| | 1 | 2 | 3 | 4 | 5 | 6 |
| K | 0 | 0 | −4.79165607 | 2.343010519 | −98.9449255 | −3.19764536 |
| A | −0.1594326 | −0.70480677 | −0.58338622 | 0.112268061 | 0.229483454 | −0.26462945 |
| B | 0.102029578 | 3.379425192 | 3.897588112 | −1.01693249 | −2.44622768 | 0.708083997 |
| D | 0.274633818 | −12.271402 | −16.8240139 | 3.229706052 | 9.608969947 | −2.35062614 |
| D | −1.31769106 | 30.70091199 | 50.69252396 | −6.60856209 | −24.3491879 | 6.84124129 |
| E | 3.033917661 | −49.5310983 | −107.463566 | 8.94006738 | 47.0177542 | −12.2767522 |
| F | −3.95992108 | 49.05247795 | 156.0480147 | −7.9414022 | −62.2508146 | 12.75829802 |
| G | 2.956222697 | −26.9475712 | −147.796967 | 4.1954644 | 53.83115188 | −6.97983309 |
| H | −1.19288565 | 5.236730107 | 82.08314035 | −1.00939748 | −26.9075637 | 1.498009138 |
| J | 0.20136826 | 0 | −20.274749 | 0 | 5.841833302 | 0.023483739 |

TABLE 6-continued

| | Lens Surface | | | | |
|---|---|---|---|---|---|
| | 7 | 8 | 10 | 11 | 12 |
| K | 0 | −1.76527296 | −6.38794849 | −1.6583674 | −3.83009592 |
| A | −0.18326551 | −0.21246482 | −0.25726278 | −0.45671332 | −0.25625008 |
| B | 0.603328603 | 0.381465005 | 0.550212252 | 0.430877666 | 0.269941086 |
| D | −2.87006608 | −1.01998363 | −0.79331071 | −0.32242053 | −0.20985113 |
| D | 9.40609804 | 2.021131941 | 0.842440155 | 0.183114531 | 0.113382447 |
| E | −20.6084543 | −3.21474974 | −0.45868595 | −0.06789434 | −0.04163585 |
| F | 29.59993026 | 4.213317169 | 0.060556208 | 0.015392885 | 0.010068245 |
| G | −26.804514 | −3.68479779 | 0.048550651 | −0.00200883 | −0.00151707 |
| H | 14.01278854 | 1.93029247 | −0.0217377 | 0.000131866 | 0.000128147 |
| J | −3.23285377 | −0.4398883 | 0.002694539 | −2.93E−06 | −4.62E−06 |

Figure 6:
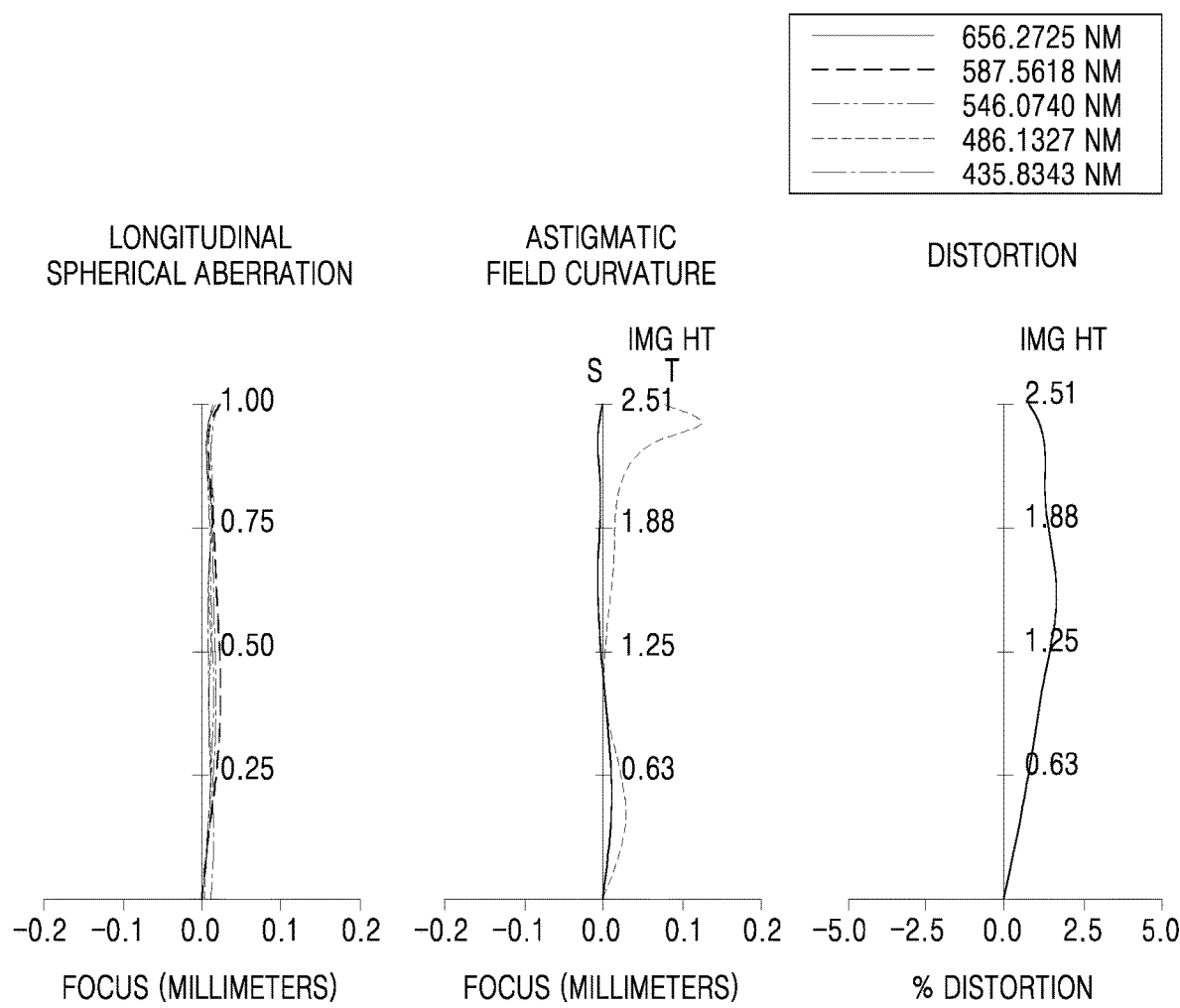
FIG. 6 is an aberration diagram of the optical lens assembly according to the third numerical embodiment from among various embodiments.

FIG. 6 illustrates the longitudinal spherical aberration, astigmatic field curves, and distortion of the optical lens assembly 100-3 according to the third numerical embodiment.

Fourth Numerical Embodiment

FIG. 7 illustrates the optical lens assembly 100-4 according to the fourth numerical embodiment from among various embodiments, and Table 7 shows, for example, design data of the fourth numerical embodiment.

In the fourth numerical embodiment, an F-number is 1.77, a half field of view is 39.9°, and a focal length f is 2.95 mm.

TABLE 7

| Lens Surface | R | Dn | nd | vd |
|---|---|---|---|---|
| ST | infinity | 0.05 | | |
| 1* | infinity | 0.25 | 1.63915 | 23.51 |
| 2* | 28.954 | 0.025 | | |
| 3* | 1.991 | 0.712 | 1.54401 | 55.91 |
| 4* | −2.552 | 0.025 | | |
| 5* | 2.801 | 0.21 | 1.6504 | 21.47 |
| 6* | 1.255 | 0.407 | | |
| 7* | −59.51 | 0.31 | 1.61444 | 25.94 |

TABLE 7-continued

| Lens Surface | R | Dn | nd | vd |
|---|---|---|---|---|
| 8* | −90.996 | 0.148 | | |
| 9 | −8.649 | 0.49 | 1.54401 | 59.91 |
| 10* | −1.044 | 0.238 | | |
| 11* | 3.142 | 0.35 | 1.54401 | 59.91 |
| 12* | 0.783 | 0.366 | | |
| 13 | infinity | 0.11 | 1.5168 | 64.2 |
| 14 | infinity | 0.52 | | |
| IMG | infinity | 0 | | |

Table 8 shows aspherical coefficients in the fourth numerical embodiment.

TABLE 8

| | Lens Surface | | | | | |
|---|---|---|---|---|---|---|
| | 1 | 2 | 3 | 4 | 5 | 6 |
| K | 0 | 0 | −4.40393732 | 1.914217105 | −98.9999673 | −3.54935318 |
| A | −0.1598326 | −0.6369551 | −0.51204374 | 0.145638498 | 0.261030153 | −0.2172608 |
| B | 0.102029578 | 2.866953139 | 3.219909192 | −1.43923065 | −3.03293916 | 0.353208769 |
| C | 0.274633817 | −9.5830525 | −12.8885822 | 5.587680419 | 12.56988919 | −1.01707615 |
| D | −1.31769105 | 21.69788777 | 35.87153521 | −13.5668214 | −33.8843785 | 3.585138619 |
| E | 3.033917649 | −30.6951913 | −71.0259588 | 20.811283 | 63.97914961 | −7.49411912 |
| F | −3.95992105 | 25.27099573 | 97.94219476 | −19.6611716 | −82.4996604 | 9.045804971 |
| G | 2.956222665 | −10.4006568 | −89.7313425 | 10.3982198 | 68.55109048 | −6.11919157 |
| H | −1.19288563 | 1.372461071 | 48.96876324 | −2.36349605 | −32.8827775 | 2.084488396 |
| J | 0.201368819 | 0 | −12.035051 | 0 | 6.874825799 | −0.26806353 |

| | Lens Surface | | | | |
|---|---|---|---|---|---|
| | 7 | 8 | 10 | 11 | 12 |
| K | 0 | −1.76527394 | −6.57207129 | −0.88730176 | −4.49100937 |
| A | −0.07978167 | −0.13828067 | −0.25336227 | −0.48623482 | −0.24052702 |
| B | 0.08664815 | 0.075783532 | 0.55021389 | 0.493955505 | 0.24531222 |
| C | −0.00387378 | 0.13455266 | −0.68040551 | −0.42589963 | −0.19062251 |
| D | −1.23682268 | −0.81016726 | 0.42033188 | 0.257979646 | 0.101095 |
| E | 4.649186617 | 1.05722949 | 0.230220326 | −0.0831965 | −0.03545966 |
| F | −8.64915371 | 0.003352049 | −0.53360342 | 0.008184773 | 0.007883065 |
| G | 8.795256357 | −1.3316086 | 0.311361424 | 0.002484068 | −0.00102401 |
| H | −4.45798546 | 1.296737437 | −0.09220729 | −0.00075966 | 6.55E−05 |
| J | 0.849938617 | −0.39337871 | 0.009892929 | 6.03E−05 | −1.25E−06 |

Figure 8:
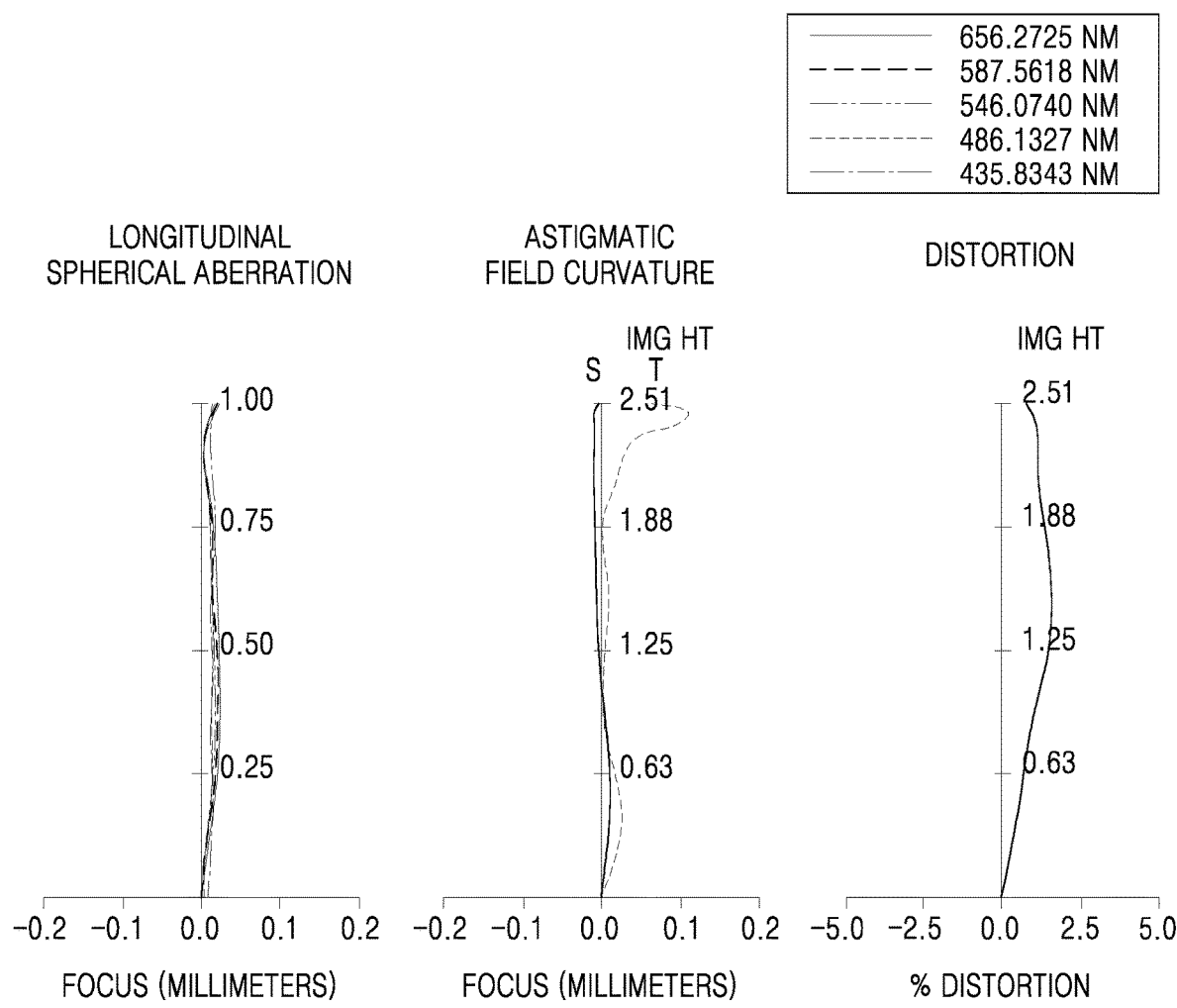
FIG. 8 is an aberration diagram of the optical lens assembly according to the fourth numerical embodiment from among various embodiments.

FIG. 8 illustrates the longitudinal spherical aberration, astigmatic field curves, and distortion of the optical lens assembly according to the fourth numerical embodiment.

Fifth Numerical Embodiment

FIG. 9 illustrates the optical lens assembly 100-5 according to the fifth numerical embodiment from among various embodiments, and Table 9 shows, for example, design data of the fifth numerical embodiment.

In the fifth numerical embodiment, an F-number is 1.77, a half field of view is 39.8°, a focal length f is 2.94 mm.

TABLE 9

| Lens Surface | R | Dn | nd | vd |
|---|---|---|---|---|
| ST | infinity | 0.08 | | |
| 1* | infinity | 0.25 | 1.65038 | 21.52 |
| 2* | 42.272 | 0.025 | | |
| 3* | 1.88 | 0.738 | 1.5441 | 56.09 |
| 4* | −2.471 | 0.02 | | |
| 5* | 2.905 | 0.18 | 1.69038 | 21.52 |
| 6* | 1.253 | 0.398 | | |
| 7* | −100 | 0.29 | 1.65038 | 21.52 |

TABLE 9-continued

| Lens Surface | R | Dn | nd | vd |
|---|---|---|---|---|
| 8* | −21.703 | 0.155 | | |
| 9 | −3.642 | 0.545 | 1.5348 | 55.71 |
| 10* | −1.007 | 0.179 | | |
| 11* | 3.031 | 0.46 | 1.5441 | 56.09 |
| 12* | 0.785 | 0.326 | | |
| 13 | infinity | 0.11 | 1.5168 | 64.2 |
| 14 | infinity | 0.5 | | |
| IMG | infinity | 0 | | |

Table 10 shows aspherical coefficients in the fifth numerical embodiment.

TABLE 10

| | Lens Surface | | | | | |
|---|---|---|---|---|---|---|
| | 1 | 2 | 3 | 4 | 5 | 6 |
| K | 0 | 0 | −7.94769916 | −60.7412316 | −9.44313795 | −6.79012516 |
| A | −0.17254021 | −0.77687573 | −0.56078959 | −0.48659603 | −0.39589698 | −0.05549903 |
| B | −0.15078555 | 4.038652095 | 4.10625418 | 1.121443057 | 0.043771146 | −0.17373908 |
| C | 2.808700518 | −16.5071776 | −16.9432363 | −2.77568799 | 1.663414774 | 1.311955218 |
| D | −14.4565553 | 49.13033518 | 48.79838555 | 5.224602643 | −4.74068737 | −3.15885101 |
| E | 42.97813945 | −100.915965 | −87.4140494 | −6.31087614 | 8.652444721 | 4.896408521 |
| F | −76.9158095 | 139.0803929 | 108.110734 | 4.185427115 | −10.8588898 | −4.65429105 |
| G | 81.7252543 | −122.011045 | −84.5096456 | −0.94331913 | 8.561535725 | 2.36974702 |
| H | −47.4428832 | 61.33307133 | 37.70918607 | −0.39981277 | −3.72302699 | −0.41580845 |
| J | 11.55926102 | −13.4005915 | −7.3075073 | 0.197788924 | 0.677331579 | −0.04340858 |

| | Lens Surface | | | | |
|---|---|---|---|---|---|
| | 7 | 8 | 10 | 11 | 12 |
| K | 225.4062844 | 92.65643724 | −6.19861504 | 0.188131542 | −4.57078738 |
| A | −0.06975575 | −0.10322057 | −0.37564184 | −0.47688877 | −0.1697819 |
| B | 0.075753201 | 0.031973027 | 0.762432341 | 0.498035845 | 0..138084188 |
| C | −0.15539922 | 0.423897855 | −1.03295266 | −0.43881732 | −0.08121329 |
| D | −0.06077308 | −2.25244287 | 0.813203431 | 0.2944809 | 0.031895781 |
| E | 0.393636921 | 5.055631036 | −0.00421342 | −0.1390619 | −0.00823385 |
| F | −0.21643345 | −6.53355791 | −0.54355323 | 0.04523583 | 0.001349993 |
| G | 0 | 5.085632217 | 0.431204146 | −0.00967569 | −0.00013293 |
| H | 0 | −2.15815725 | −0.1430115 | 0.001216741 | 7.11E−06 |
| J | 0 | 0.376535313 | 0.018081665 | −6.73E−05 | −1.58E−07 |

Figure 10:
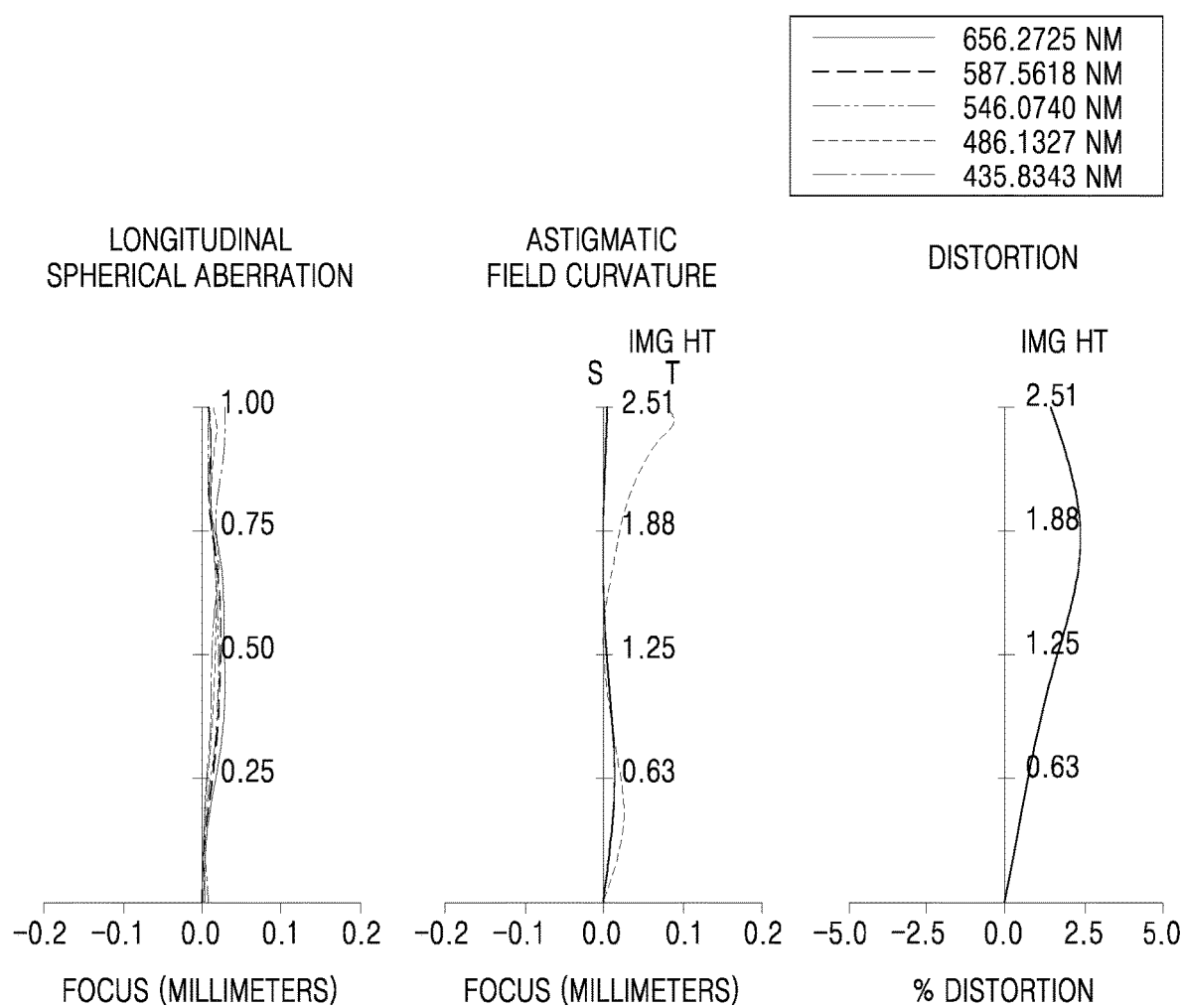
FIG. 10 is an aberration diagram of the optical lens assembly according to the fifth numerical embodiment from among various embodiments.

FIG. 10 illustrates the longitudinal spherical aberration, astigmatic field curves, and distortion of the optical lens assembly 100-5 according to the fifth numerical embodiment.

Sixth Numerical Embodiment

FIG. 11 illustrates the optical lens assembly 100-6 according to a sixth numerical embodiment from among various embodiments, and Table 11 shows, for example, design data of the sixth numerical embodiment.

In the sixth numerical embodiment, an F-number is 1.77, a half field of view is 40.15°, and a focal length f is 2.92 mm.

TABLE 11

| Lens Surface | R | Dn | nd | vd |
|---|---|---|---|---|
| ST | infinity | 0.08 | | |
| 1* | infinity | 0.25 | 1.63972 | 23.52 |
| 2* | infinity | 0.03 | | |
| 3* | 2.73 | 0.661 | 1.5448 | 56.05 |
| 4* | −2.878 | 0.03 | | |
| 5* | 1.879 | 0.23 | 1.66121 | 20.35 |
| 6* | 1.28 | 0.562 | | |
| 7* | −5.222 | 0.22 | 1.66121 | 20.35 |
| 8* | −10.211 | 0.044 | | |
| 9 | 63.217 | 0.589 | 1.5448 | 56.05 |
| 10* | −1.459 | 0.342 | | |
| 11* | 2.853 | 0.35 | 1.5448 | 56.05 |
| 12* | 0.858 | 0.261 | | |
| 13 | infinity | 0.11 | 1.5168 | 64.2 |
| 14 | infinity | 0.47 | | |
| IMG | infinity | 0 | | |

Table 12 shows aspherical coefficients in the sixth numerical embodiment.

TABLE 12

| | | | Lens Surface | | | |
|---|---|---|---|---|---|---|
| | 1 | 2 | 3 | 4 | 5 | 6 |
| K | 0 | 0 | 0.11626519 | 2.561632987 | 0 | −3.03384606 |
| A | −0.22974829 | −0.18139175 | 0.054434461 | 0.169255023 | −0.19173143 | −0.17075241 |
| B | 0.466726238 | −0.11667028 | −0.29321811 | −1.28256764 | −0.8418023 | 0.273159428 |
| C | −2.75688219 | 1.038789557 | 0.862015374 | 4.530992658 | 3.085109916 | −2.19600717 |
| D | 12.42265846 | −1.70861773 | −1.26330714 | −10.1489419 | −6.13033755 | 9.93413384 |
| E | −34.6800554 | −0.4739675 | −0.10700632 | 14.37124882 | 7.8927092 | −24.9101748 |
| F | 60.79427143 | 6.859884738 | 3.191891408 | −12.4763027 | −5.99305266 | 37.76080053 |
| G | −65.1193675 | −11.8278114 | −4.80193208 | 6.104175479 | 1.983938264 | −34.4788188 |
| H | 38.88804273 | 8.964373024 | 3.079411231 | −1.36483023 | 0.235357071 | 17.42478835 |
| J | −9.90480545 | −2.61800914 | −0.75079282 | 0.054466804 | −0.24288234 | −3.73856342 |

| | | Lens Surface | | | |
|---|---|---|---|---|---|
| | 7 | 8 | 10 | 11 | 12 |
| K | −50 | −3.73018328 | −7.13099461 | 0 | −4.44150048 |
| A | −0.06759512 | −0.07563501 | −0.07586951 | −0.53892445 | −0.2032617 |
| B | 0.025544607 | 0.009664838 | 0.108262381 | 0.467589035 | 0.146212488 |
| C | 0.00572774 | 0.024290162 | 0.050118029 | −0.33715995 | −0.06709578 |
| D | 0.002418923 | 0.015260558 | −0.22086977 | 0.180485171 | 0.012229226 |
| E | 0.029497672 | −0.0095845 | 0.244756876 | −0.05624789 | 0.004117438 |
| F | −0.3234349 | 0.004368229 | −0.12621633 | 0.009359559 | −0.00304059 |
| G | 0 | 0 | 0.026849808 | −0.0015246 | 0.00077082 |
| H | 0 | 0 | 5.32E−05 | 0.000233214 | −9.31E−05 |
| J | 0 | 0 | −0.0005641 | −2.88E−05 | 4.46E−06 |

Figure 12:
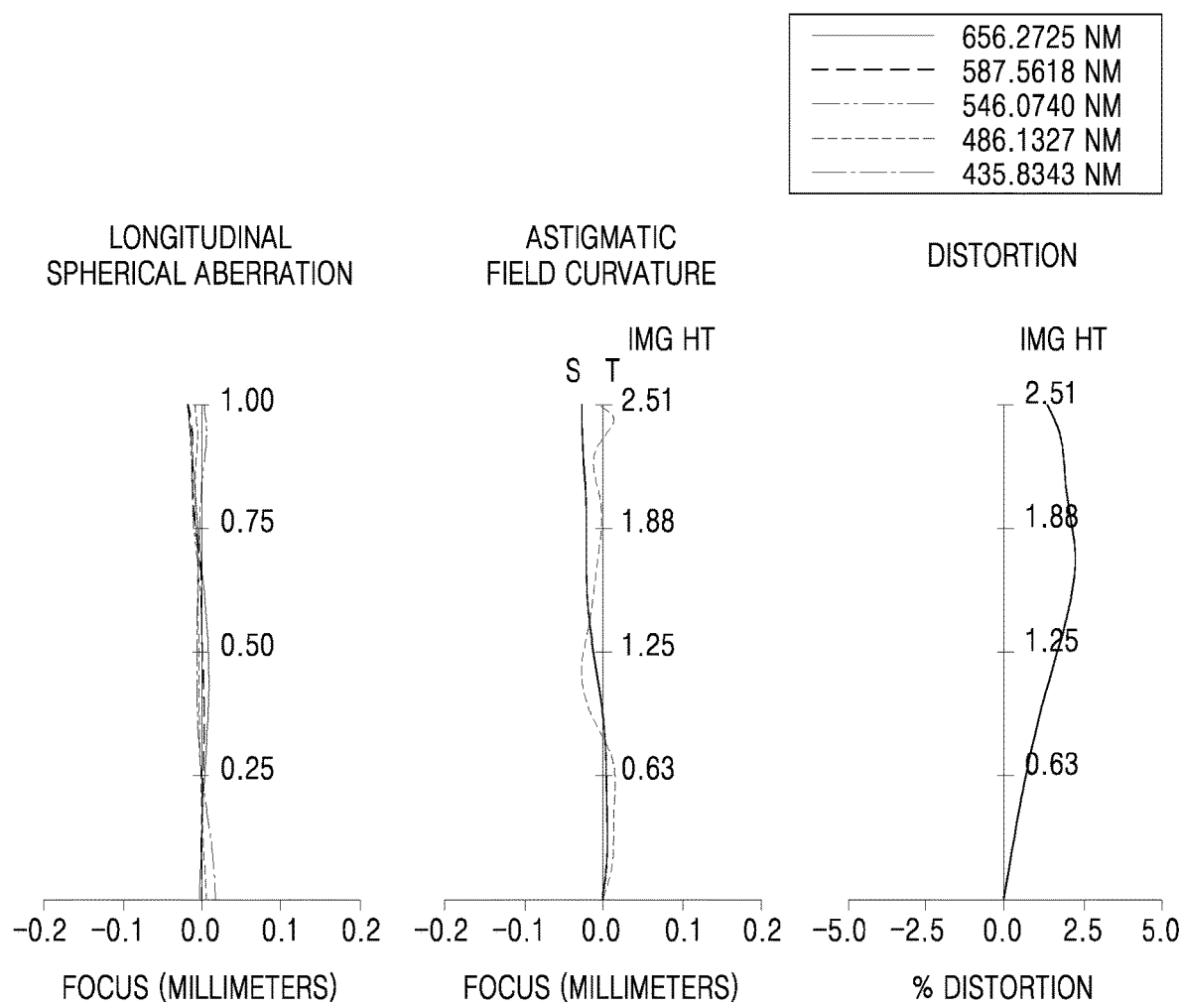
FIG. 12 is an aberration diagram of the optical lens assembly according to the sixth numerical embodiment from among various embodiments.

FIG. 12 illustrates the longitudinal spherical aberration, astigmatic field curves, and distortion of the optical lens assembly 100-6 according to the sixth numerical embodiment.

Next, it is shown that an optical lens assembly according to various embodiments satisfies Inequality1 to Inequality 8.

TABLE 13

| | f | f1 | f2 | f3 | f4 | f5 | f6 | Half Field of View |
|---|---|---|---|---|---|---|---|---|
| Embodiment 1 | 2.925 | −55.55 | 1.963 | −3.057 | 49.602 | 2.339 | −2.136 | 39.9 |
| Embodiment 2 | 2.92 | −18.058 | 2.321 | −5.736 | 34.385 | 2.399 | −2.086 | 40 |
| Embodiment 3 | 2.95 | −35.978 | 2.181 | −3.713 | −81.662 | 2.254 | −2.267 | 39.9 |
| Embodiment 4 | 2.95 | −44.853 | 2.167 | −3.657 | −278.443 | 2.125 | −2.016 | 39.9 |
| Embodiment 5 | 2.937 | −64.302 | 2.078 | −3.504 | 42.102 | 2.416 | −2.091 | 39.8 |
| Embodiment 6 | 2.92 | −55.55 | 1.963 | −3.139 | 97.952 | 1.986 | −1.808 | 40.15 |

| | OAL | FNO | L1 ape/ L6 ape | V2−V3 | f1/f | CT3/OAL | CT5/OAL | R3/R4 |
|---|---|---|---|---|---|---|---|---|
| Embodiment 1 | 4.175 | 1.77 | 0.379 | 34.6 | −18.9267 | 0.043 | 0.130 | −0.872 |
| Embodiment 2 | 4.175 | 1.77 | 0.384 | 34.6 | −6.16425 | 0.056 | 0.110 | −0.565 |
| Embodiment 3 | 4.18 | 1.77 | 0.382 | 34.4 | −12.1959 | 0.05 | 0.117 | −0.678 |
| Embodiment 4 | 4.18 | 1.77 | 0.396 | 34.4 | −15.2044 | 0.05 | 0.118 | −0.779 |
| Embodiment 5 | 4.175 | 1.78 | 0.396 | 34.6 | −21.8938 | 0.043 | 0.130 | −0.760 |
| Embodiment 6 | 4.179 | 1.77 | 0.371 | 34.6 | −19.024 | 0.058 | 0.138 | −0.872 |

An optical lens assembly according to various embodiments may be applied to, for example, an electronic apparatus adopting an image sensor. An optical lens assembly according to an example embodiment may be applied to various electronic apparatuses such as digital cameras, Interchangeable lens cameras, video cameras, mobile phone cameras, or cameras for compact mobile devices.

Figure 13:
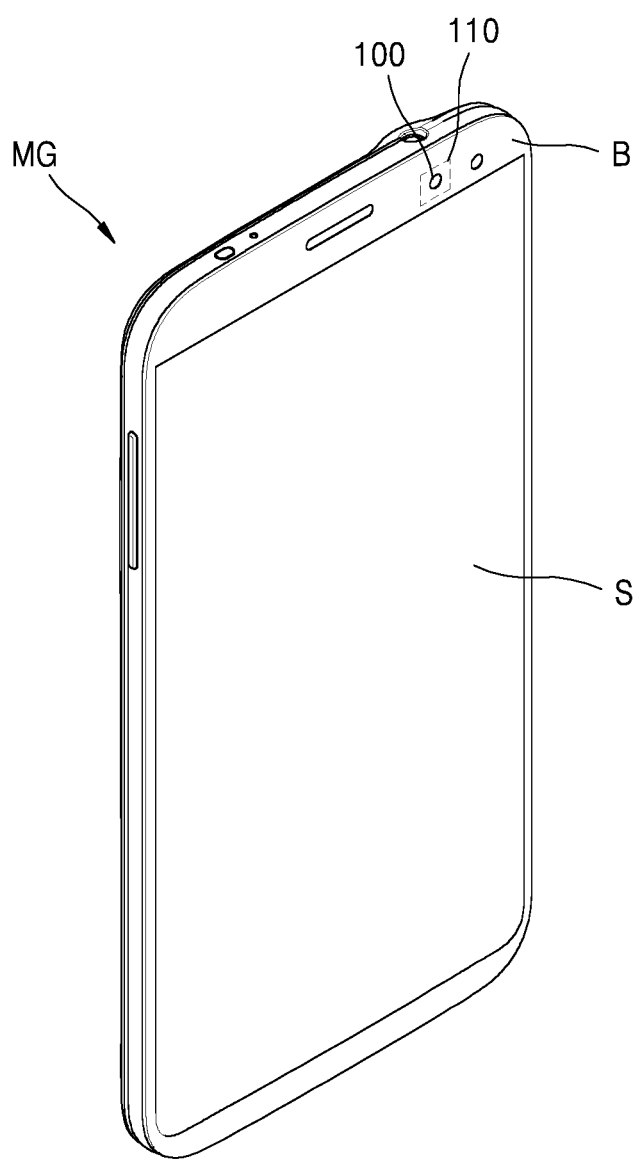
FIG. 13 illustrates an example of an electronic apparatus including an optical lens assembly, according to various embodiments.

FIG. 13 illustrates an example of an electronic apparatus MG including an optical lens assembly according to an example embodiment. Although FIG. 13 illustrates an example in which the electronic apparatus MG is applied to a mobile phone, the disclosure is not limited thereto. The electronic apparatus MG may include at least one optical lens assembly 100 and an image sensor 110 that receives light of an image formed by the at least one optical lens assembly 100 and converts the received image light to an electrical image signal. The optical lens assemblies descried with reference to FIGS. 1 to 12 may be employed as the optical lens assembly 100. As an optical lens assembly according to various embodiments is applied to compact digital cameras or photographing devices of mobile phones, photographing devices capable of photographing with high performance may be implemented. For example, when an optical lens assembly according to various embodiments is applied to the front plane of a mobile device, the size of a bezel B may be reduced by miniaturizing the optical lens assembly. By reducing the size of a bezel, the size of an effective screen of a mobile device may be increased. Furthermore, as an optical lens assembly according to various embodiments implements a wide angle, high-quality self camera photography is possible.

The image sensor 110 may include a sensor, for example, a complementary metal oxide semiconductor (CMOS) image sensor or a charge coupled device (CCD). The image sensor is not limited thereto and may be, for example, a device for converting an image of an object to an electrical image signal.

Figure 14:
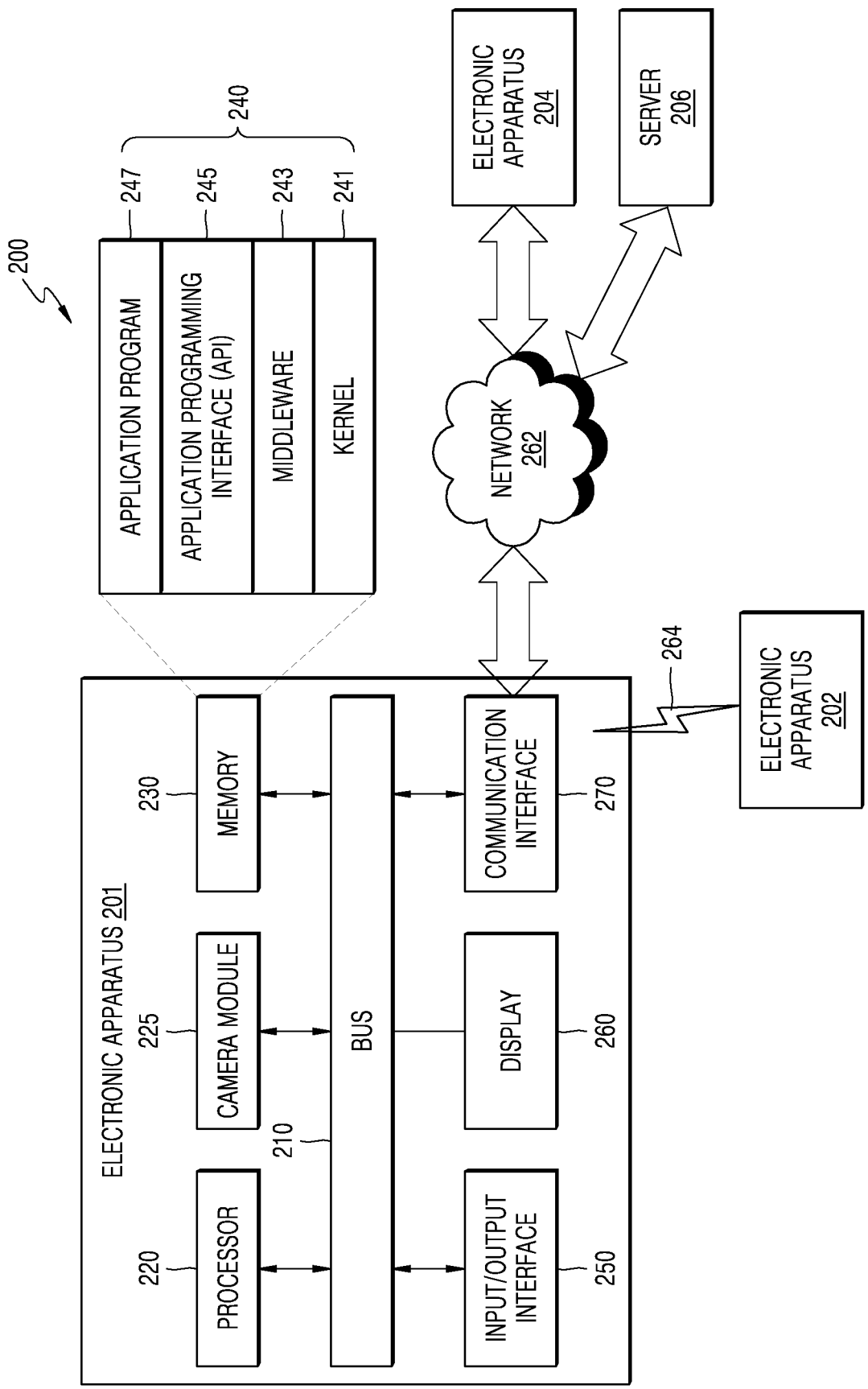
FIG. 14 illustrates a network environment system according to various embodiments.

Referring to FIG. 14, an electronic apparatus 201 in a network environment 200 is provided in various embodiments. The electronic apparatus 201 may include a bus 110, a processor 220, a camera module 225, a memory 230, an input/output interface 250, a display 260, and a communication interface 270. In some embodiments, the electronic apparatus 201 may omit at least one of constituent elements or additionally include another constituent element.

The bus 210 may include, for example, a circuit for connecting the constituent elements 210-270 to each other and transmitting communications between the constituent elements, for example, control messages and/or data.

The processor 220 may include one or more of a central processing unit (CPU), an application processor (AP), or a communication processor (CP). The processor 220 may perform, for example, calculation or data processing regarding control and/or communication of at least one of other constituent elements of the electronic apparatus 201.

The camera module 225, which is capable of capturing, for example, still images and movies, may include, according to an embodiment, one or more image sensors, for example, a front sensor or a rear sensor, a lens, an image signal processor (ISP), or a flash, for example, an LED or a xenon lamp. For example, an optical lens assembly according to various embodiments may be applied to the camera module 225.

The memory 230 may include volatile and/or non-volatile memories. The memory 230 may store, for example, instructions or data related to at least one of other constituent elements of the electronic apparatus 201. According to an embodiment, the memory 230 may store software and/or a program 240. The program 240 may include, for example, a kernel 241, a middleware 243, an application programming interface (API) 245, and/or an application program or "application" 247. At least some of the kernel 241, the middleware 243, or the API 245 may be referred to as an operating system (OS).

The kernel 241 may control or manage, for example, system resources such as the bus 210, the processor 220, or the memory 230 used to execute operations or functions implemented in other programs such as the middleware 243, the API 245, or an application program 247. Furthermore, the kernel 241 may be provided with an interface for controlling or managing system resources by accessing individual constituent elements of the electronic apparatus 201 in the middleware 243, the API 245, or the application program 247.

The middleware 243 may perform, for example, a bridging role to enable exchange of data as the API 245 or the application program 247 communicates with the kernel 241.

Furthermore, the middleware 243 may process one or more work requests received from the application program 247 according to the priority. For example, the middleware 243 may assign at least one of the application program 247 with a priority to use the system resource, such as the bus 210, the processor 220, or the memory 230, of the electronic apparatus 201. For example, the middleware 243 may perform scheduling or load balancing with respect to the one or more job requests, by processing the one or more job requests according to the priority assigned to the at least one of the application programs 217.

The API 245 is an interface, for example, for the application 247 to control functions provided by the kernel 241 or the middleware 243 and may include, for example, at least one interface or function, such as instructions, for file control, window control, image processing, or character control.

The input/output interface 250 may serve as an interface to transmit, for example, commands or data input by a user or other external devices, to other constituent element(s) of the electronic apparatus 201. Furthermore, the input/output interface 250 may output commands or data received from other constituent element(s) of the electronic apparatus 201 to a user or other external devices.

The display 260 may include, for example, a liquid crystal display (LCD), a light-emitting diode (LED) display, an organic light-emitting diode (OLED) display, or a microelectromechanical systems (MEMS) display, or an electronic paper display. The display 260 may display, for example, various contents such as texts, images, videos, icons, or symbols to the user. The display 260 may include a touch screen and may receive, for example, touch, gesture, proximity, or hovering inputs using an electronic pen or a part of a user's body.

The communication interface 270 may set communication between, for example, the electronic apparatus 201 and an external device such as a first external electronic apparatus 202, a second external electronic apparatus 204, or a server 206. For example, the communication interface 270 may be connected to a network 262 via wireless communication or wired communication and may communicate with an external device such as the second external electronic apparatus 204 or the server 206.

The wireless communication may use, for example, as a cellular communication protocol, for example, at least one of long-term evolution (LTE), LTE Advance (LTE-A), code division multiple access (CDMA), wideband CDMA (WCDMA), a universal mobile telecommunications system (UMTS), wireless broadband (WiBro), and a global system for mobile communications (GSM). Furthermore, the wireless communication may include, for example, a short-range communication 264. The short-range communication 264 may include, for example, at least one of wireless fidelity (WiFi), Bluetooth, near field communication (NFC), and global navigation satellite system (GNSS). The GNSS may include, according to a used area or a bandwidth, for example, at least one of a global positioning system (GPS), a global navigation satellite system (Glonass), a Beidou navigation satellite system (hereinafter, referred to as the "Beidou"), and Galileo or the European global satellite-based navigation system. In the present disclosure, "GPS" may be interchangeably used with "GNSS". The wired communication may include, for example, at least one of a universal serial bus (USB), a high definition multimedia interface (HDMI), recommended standard-232 (RS-232), and a plain old telephone service (POTS). The network 262 may include a telecommunications network, for example, at least one of a computer network such as LAN or WAN, the Internet, and a telephone network.

Each of the first and second external electronic apparatuses 202 and 204 may be a device that is the same as or different from the electronic apparatus 201. According to an embodiment, the server 206 may include a group of one or more servers. According to various embodiments, the whole or part of operations performed on the electronic apparatus 201 may be performed on another electronic apparatus or a plurality of electronic apparatuses, for example, the electronic apparatuses 202 and 204 or the server 206. According to an embodiment, when the electronic apparatus 201 performs a certain function or service automatically or on a request, the electronic apparatus 201, instead of or in addition to performing the function or service therein, may request another device, for example, the electronic apparatuses 202 and 204, or the server 106 to perform at least part of the function related thereto. Another electronic apparatus, for example, the electronic apparatuses 202 and 204 or the server 106, may perform the requested function or additional function and transmit a result thereof to the electronic apparatus 201. The electronic apparatus 201 may process a received result without change or additionally and provide the requested function or service. To this end, for example, cloud computing, distributed computing, or client-server computing technology may be used.

Figure 15:
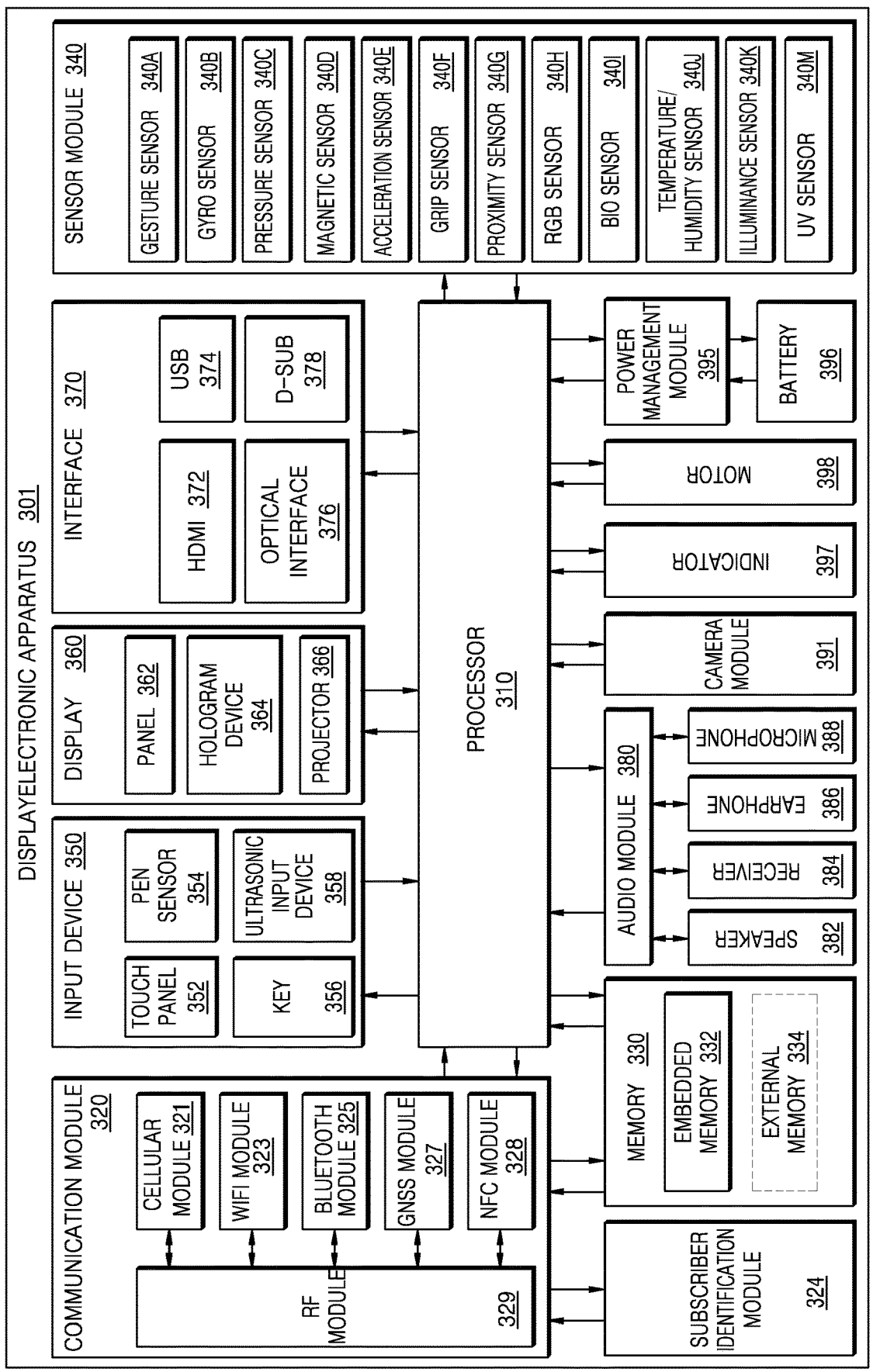
FIG. 15 is a block diagram of an electronic apparatus according to various embodiments.

FIG. 15 is a block diagram of an electronic apparatus 301 according to various embodiments. The electronic apparatus 301 may include, for example, the whole or part of the electronic apparatus 201 of FIG. 14. The electronic apparatus 301 may include one or more processors, for example, a processor or application processor (AP) 310, a communication module 320, a subscriber identification module 324, a memory 330, a sensor module 340, an input device 350, a display 360, an interface 370, an audio module 380, a camera module 391, a power management module 395, a battery 396, an indicator 397, and a motor 398.

The processor 310 may control a plurality of hardware or software constituent elements connected to the processor 310 by driving, for example, an operating system or an application program, and may perform various data processing and operations. The processor 310 may be implemented by, for example, a system-on-chip (SoC). According to an embodiment, the processor 310 may further include a graphic processing unit (GPU) and/or an image signal processor. The processor 310 may include at least part of the constituent elements of FIG. 15, for example, a cellular module 321. The processor 310 may process commands or data received from at least one of other constituent elements, for example, a non-volatile memory, by loading the commands or data on a volatile memory, and may store various pieces of data in the non-volatile memory.

The communication module 320 may have a configuration that is the same or similar to that of the communication interface 270 of FIG. 14. The communication module 320 may include, for example, the cellular module 321, a WiFi module 323, a Bluetooth module 325, a GNSS module 327 such as a GPS module, a Glonass module, a Beidou module, or a Galileo module, a NFC module 328, or a radio frequency (RF) module 329.

The cellular module 321 may provide, for example, a voice call, a video call, a text service, or the Internet service through a communication network. According to an embodiment, the cellular module 321 may perform classification and authentication of the electronic apparatus 301 in the communication network by using a subscriber identification module 324, for example, a SIM card. According to an embodiment, the cellular module 221 may perform at least some of functions provided by the processor 310. According to an embodiment, the cellular module 321 may a communication processor CP.

Each of the WiFi module 323, the Bluetooth module 325, the GNSS module 327 and the NFC module 328 may include, for example, a processor for processing data transceived through a corresponding module. In some embodiments, at least some, for example, two or more, of the cellular module 321, the WiFi module 323, the Bluetooth module 325, the GNSS module 327, and the NFC module 328 may be included in one integrated chip IC or an IC package.

The RF module 329 may transceive, for example, a communication signal, for example, an RF signals. The RF module 329 may include, for example, a transceiver, a power amp module (PAM), a frequency filter, a low noise amplifier (LNA), or an antenna. In another embodiment, at least one of the cellular module 221, the WiFi module 323, the Bluetooth module 325, the GNSS module 327, and the NFC module 328 may transceive an RF signal through a separate RF module.

The subscriber identification module 324 may include, for example, a card and/or embedded SIM including a subscriber identification module, unique identification information, for example, an integrated circuit card identifier (IC-CID), or subscriber information, for example, international mobile subscriber identity (IMSI).

The memory 330, for example, the memory 330, may include, for example, an embedded memory 332 or an external memory 334. The embedded memory 332 may include at least one of, for example, volatile memory such as dynamic RAM (DRAM), static RAM (SRAM), or synchronous dynamic RAM (SDRAM), and non-volatile memory such as one time programmable ROM (OTPROM), programmable ROM (PROM), erasable and programmable ROM (EPROM), electrically erasable and programmable ROM (EEPROM), mask ROM, flash ROM, flash memory, for example, NAND flash or NOR flash, hard disk drives, or solid state drives (SSD).

The external memory 334 may further include a flash drive such as compact flash (CF), secure digital (SD), micro secure digital (Micro-SD), mini secure digital (Mini-SD), extreme digital (xD), multi-media card (MMC), or memory stick. The external memory 334 may be operatively and/or physically connected with the electronic apparatus 301 via various interfaces.

The sensor module 340 may, for example, measure a physical quantity or detect an operational state of the electronic apparatus 301, and may convert measured or detected information to an electrical signal. The sensor module 340 may include at least one of, for example, a gesture sensor 340A, a gyro sensor 340B, a pressure sensor 340C, a magnetic sensor 340D, an acceleration sensor 340E, a grip sensor 340F, a proximity sensor 340G, a color sensor 340H, for example, red, green, and blue (RGB) sensors, a biosensor 340I, a temperature/humidity sensor 340J, an illuminance sensor 340K, or an ultra violet (UV) sensor 340M. Additionally or alternatively, the sensor module 340 may include, for example, an E-nose sensor, an electromyography (EMG) sensor, an electroencephalogram (EEG) sensor), an electrocardiogram (ECG) sensor, an infrared (IR) sensor, an iris sensor, and/or a fingerprint sensor. The sensor module 340 may further include a control circuit for controlling at least one of sensors provided therein. In some embodiments, the electronic apparatus 301 may further include a processor configured to control the sensor module 340, as a part of or separated from the processor 310, thereby controlling the sensor module 340 while the processor 310 is in a sleep state.

The input device 350 may include, for example, a touch panel 352, a (digital) pen sensor 354, a key 356, or an ultrasonic input device 358. The touch panel 352 may employ at least one of, for example, a capacitive method, a resistive method, an infrared method, and an ultrasonic method. Furthermore, the touch panel 352 may further include a control circuit. The touch panel 352 may further include a tactile layer and may provide a tactile response to a user.

The (digital) pen sensor 354 may include, for example, a recognition sheet that is a part of a touch panel or separate therefrom. The key 356 may include, for example, a physical button, an optical key, or a keypad. The ultrasonic input device 358 may detect ultrasound generated from an input device through a microphone, for example, the microphone 388, and check data corresponding to the detected ultrasound.

The display 360, for example, the display 360, may include a panel 362, a hologram device 364, or a projector 366. The panel 362 may same configuration as or a similar configuration to the display 260 of FIG. 14. The panel 362 may be, for example, flexible, transparent, or wearable. The panel 362 may be configured to be one module with the touch panel 352. According to an embodiment, the panel 362 may include a pressure sensor or a force sensor that may measure the intensity of pressure of a user's touch. The pressure sensor may be implemented to be integral with the touch panel 352 or as one or more sensors separate from the touch panel 352. The hologram device 364 may display a three-dimensional image in the air using interference of light. The projector 366 may display an image by projecting light onto a screen. The screen may be located, for example, inside or outside the electronic apparatus 301. According to an embodiment, the display 360 may further include a control circuit for controlling the panel 362, the hologram device 364, or the projector 366.

The interface 370 may include, for example, a high-definition multimedia interface (HDMI) 372, a universal serial bus (USB) 374, an optical interface 376, or a D-sub-miniature 378. The interface 370 may be included in, for example, the communication interface 370 of FIG. 22. Additionally or alternatively, the interface 370 may include, for example, a mobile high-definition link (MHL) interface, a secure digital (SD) card/a multi-media card (MMC) interface, or an infrared data association (IrDA) specification interface.

The audio module 380 may convert, for example, a sound and electrical signal in bi-direction. At least some of constituent elements of the audio module 380 may be included into, for example, input/output interface 245 of FIG. 14. The audio module 380 may process sound information input or output through, for example, a speaker 382, a receiver 384, an earphone 386, or a microphone 388.

The camera module 391, which is a device for capturing, for example, a still image and a video, may include one or more image sensors, for example, a front sensor or a rear sensor, a lens, an image signal processor (ISP), or a camera flash, for example, an LED or xenon lamp. For example, the optical lens assembly according to various embodiments may be applied to the camera module 391.

The power management module 395 may manage, for example, electric power of the electronic apparatus 301. The electronic apparatus 301 may be an electronic apparatus that receives electric power through a battery, but the present disclosure is not limited thereto. According to an embodiment, the power management module 395 may include a power management integrated circuit (PMIC), a charger integrated circuit (IC), a battery, or a fuel gauge. The PMIC may have a wired and/or wireless charging system. A wireless charging system may include, for example, a magnetic resonance method, a magnetic induction method, or an electromagnetic wave method, and may further include an additional circuit for wireless charging, for example, a coil loop, a resonant circuit, or a rectifier. A battery gauge may measure, for example, a remaining amount, a voltage, current, or temperature during charging of the battery 396. The battery 396 may include, for example, a rechargeable battery and/or a solar battery.

The indicator 397 may display a particular state, for example, the processor 310, for example, a booting state, a message state, or a charge state, of the electronic apparatus 301 or a part thereof. The motor 398 may convert an electrical signal to mechanical vibration, thereby generating vibration or a haptic effect. Although not illustrated, the electronic apparatus 301 may include a processing device for supporting a mobile TV, for example, a GPU. The processing device for supporting a mobile TV may process media data according to specifications, for example, digital multimedia broadcasting (DMB), digital video broadcasting (DVB), or mediaFlo™.

An optical lens assembly including a plurality of lenses arranged from an object side to an image side includes a first lens having a negative refractive power, a second lens having a positive refractive power, a third lens having a negative refractive power, a fourth lens having a refractive power, a fifth lens having a refractive power, a sixth lens having a negative refractive power and disposed close to an image, and a stop disposed at an object side of the first lens, wherein the optical lens assembly satisfies the following inequalities:

$$0.2 < L1ape/L6ape < 0.4$$

$$-300 < f1/f < -5 \qquad \text{<Inequalities>}$$

wherein L1ape denotes an effective radius of an object side surface of the first lens, L6ape denotes an effective radius of an image side surface of the sixth lens, f1 denotes an effective focal length of the first lens, and f denotes a total focal length of the optical lens assembly.

For example, the optical lens assembly may satisfy the following inequalities:

$$1.4 < f/EPD < 1.9$$

$$75 < FOV < 95 \qquad \text{<Inequalities>}$$

wherein EPD denotes an entrance pupil, f denotes a total focal length of the optical lens assembly, and FOV denotes a field of view of the optical lens assembly.

For example, the optical lens assembly may satisfy the following inequalities.

$$30 < v2 - v3 < 40 \qquad \text{<Inequalities>}$$

wherein v2 denotes an Abbe number of the second lens, and v3 denotes an Abbe number of the third lens.

For example, the optical lens assembly may satisfy the following inequalities:

$$0.02 < CT3/OAL < 0.06$$

$$0.08 < CT5/OAL < 0.15 \qquad \text{<Inequalities>}$$

wherein CT3 denotes a thickness of the third lens on the optical axis, OAL denotes a total length of an optical lens assembly, and CT5 denotes a thickness of the fifth lens on the optical axis.

For example, the third lens may have a meniscus shape convex toward the object side.

For example, the optical lens assembly may satisfy the following inequality:
<Inequality>

$$-1 < R3/R4 < -0.3$$

wherein R3 denotes a radius of curvature of the object side surface of the second lens, and R4 denotes a radius of curvature of the image side surface of the second lens.

For example, an air gap between the first lens and the second lens may be 0.1 mm or less.

For example, an air gap between the second lens and the third lens may be 0.1 mm or less.

The first lens may have a meniscus shape concave toward the object side.

The fifth lens may include a spherical surface at the object side surface or the image side surface.

According to another embodiment of the disclosure, an optical lens assembly including a plurality of lenses arranged from an object side to an image side includes a first lens having a negative refractive power, a second lens having a positive refractive power, a third lens having a negative refractive power, a fourth lens having a refractive power, a fifth lens having a refractive power, a sixth lens having a negative refractive power, and a stop disposed at an object side of the first lens, wherein the optical lens assembly satisfies the following inequalities:

$$0.2 < L1ape/L6ape < 0.4$$

$$1 < R3/R4 < -0.3 \qquad \text{<Inequalities>}$$

wherein L1ape denotes an effective radius of an object side surface of the first lens, L6ape denotes an effective radius of an image side surface of the sixth lens, R3 denotes a radius of curvature of an object side surface of the second lens, and R4 denotes a radius of curvature of an image side surface of the second lens.

According to another embodiment of the disclosure, an electronic apparatus includes an optical lens assembly and an image sensor configured to receive a light ray of an image formed by the optical lens assembly, wherein the optical lens assembly includes a first lens having a negative refractive power, a second lens having a positive refractive power, a third lens having a negative refractive power, a fourth lens having a refractive power, a fifth lens having a refractive power, a sixth lens having a negative refractive power, and a stop disposed at an object side of the first lens, which are arranged from an object side to an image side, wherein the optical lens assembly satisfies the following inequalities:

$$0.2 < L1ape/L6ape < 0.4$$

$$-300 < f1/f < -5 \qquad \text{<Inequalities>}$$

wherein L1ape denotes an effective radius of an object side surface of the first lens, L6ape denotes an effective radius of an image side surface of the sixth lens, f1 denotes an effective focal length of the first lens, and f denotes a total focal length of the optical lens assembly.

According to another embodiment of the disclosure, an electronic apparatus may include an optical lens assembly, and an image sensor configured to receive a light ray of an image formed by the optical lens assembly, wherein the optical lens assembly including a plurality of lenses arranged from an object side to an image side may include a first lens having a negative refractive power, a second lens having a positive refractive power, a third lens having a negative refractive power, a fourth lens having a refractive power, a fifth lens having a refractive power, a sixth lens having a negative refractive power, and a stop disposed at an object side of the first lens, wherein the optical lens assembly satisfies the following inequalities:

$$0.2 < L1ape/L6ape < 0.4$$

$$-1 < R3/R4 < -0.3 \qquad \text{<Inequalities>}$$

wherein L1ape denotes an effective radius of an object side surface of the first lens, L6ape denotes an effective radius of an image side surface of the sixth lens, R3 denotes a radius of curvature of an object side surface of the second lens, and R4 denotes a radius of curvature of an image side surface of the second lens.

Each of constituent elements described in the present disclosure may include one or more components, and the names of the constituent elements may vary according to the type of an electronic apparatus. In various embodiments, the electronic apparatus may include at least one of the constituent elements described in the present disclosure, and may not include some constituent elements or may further include additional other constituent elements. Furthermore, as some of constituent elements of the electronic apparatus according to various embodiments are coupled to form one entity, functions of the constituent elements before coupling may be performed in the same manner.

The term "module" used in various embodiments of the present disclosure may denote a unit including one or two or more combinations of, for example, hardware, software, or firmware. The module may be interchangeably used with terms for example, units, logics, logical blocks, components, or circuits. The module may be a minimum unit of a part that is integrally formed or a part thereof. The module may be a minimum unit performing one or more functions or a part thereof. The module may be embodied mechanically or electronically. For example, the modules according to various embodiments of the present disclosure may include at least one of an application-specific integrated circuit (ASIC) chip, field-programmable gate arrays (FPGAs), or a programmable-logic device, which performs a certain operation that is already known or will be developed in the future.

According to various embodiments, at least part of an apparatus, for example, modules or functions thereof, or a method, for example, operations, may be embodied by instructions stored in a computer-readable storage media in form of, for example, a programming module. When the instruction is executed by one or more processors, for example, the processor 220 of FIG. 18, the one or more processors may perform a function corresponding to the instruction. The computer-readable storage media may be, for example, the memory 230.

Examples of the computer-readable recording medium include magnetic media, e.g., hard disks, floppy disks, and magnetic tapes, optical media, e.g., compact disc read only memories (CD-ROMs) and digital versatile disks (DVDs), magneto-optical media, e.g., floptical disks, and hardware devices configured to store and execute program commands, for example, programming modules, e.g., read only memories (ROMs), random access memories (RAMs), flash memories, etc. Also, the program command may include not only machine code created by a compiler but also high-level programming language executable by a computer using an interpreter. The above-described hardware apparatuses may be configured to operate as one or more software modules to perform operations according to various embodiments of the present disclosure, or vise versa. A module or programming module according to various embodiments of the present disclosure may include at least one of the above-described elements or the at least one of the above-described elements may be omitted or additional other elements may be further included. According to various embodiments of the present disclosure, operations may be performed by modules, programming modules, or other elements in a sequential, parallel, iterative, or heuristic method. Furthermore, some operations may be performed in a different order, omitted, or other operations may be added thereto. It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

The invention claimed is:

1. An optical lens assembly comprising a plurality of lenses arranged from an object side to an image side, the optical lens assembly comprising:
   a first lens having a negative refractive power;
   a second lens having a positive refractive power;
   a third lens having a negative refractive power;
   a fourth lens having a refractive power;
   a fifth lens having a refractive power;
   a sixth lens having a negative refractive power and disposed close to the image side; and
   a stop disposed at an object side of the first lens,
   wherein the optical lens assembly satisfies the following inequalities:

$0.2 < L1ape/L6ape < 0.4$ $-300 < f1/f < -5$  <Inequalities> wherein L1ape denotes an effective radius of an object side surface of the first lens, L6ape denotes an effective radius of an image side surface of the sixth lens, f1 denotes an effective focal length of the first lens, and f denotes a total focal length of the optical lens assembly, and $1.4 < f/EPD < 1.9$ $75 < FOV < 95$  <Inequalities> wherein EPD denotes an entrance pupil, f denotes a total focal length of the optical lens assembly, and FOV denotes a field of view of the optical lens assembly.

2. The optical lens assembly of claim 1, wherein the optical lens assembly satisfies the following inequalities:

$30 < v2 - v3 < 40$  <Inequalities> wherein v2 denotes an Abbe number of the second lens, and v3 denotes an Abbe number of the third lens.

3. The optical lens assembly of claim 1, wherein the optical lens assembly satisfies the following inequalities:

$0.02 < CT3/OAL < 0.06$ $0.08 < CT5/OAL < 0.15$  <Inequalities> wherein CT3 denotes a thickness of the third lens on an optical axis, OAL denotes a total length of an optical lens assembly, and CT5 denotes a thickness of the fifth lens on the optical axis.

4. The optical lens assembly of claim 1, wherein the third lens has a meniscus shape convex toward the object side.

5. The optical lens assembly of claim 1, wherein the optical lens assembly satisfies the following inequality:

$1 < R3/R4 < -0.3$  <Inequality> wherein R3 denotes a radius of curvature of an object side surface of the second lens, and R4 denotes a radius of curvature of an image side surface of the second lens.

6. The optical lens assembly of claim 1, wherein an air gap between the first lens and the second lens is 0.1 mm or less.

7. The optical lens assembly of claim 1, wherein an air gap between the second lens and the third lens is 0.1 mm or less.

8. The optical lens assembly of claim 1, wherein the first lens has a meniscus shape concave toward the object side.

9. The optical lens assembly of claim 1, wherein the fifth lens has a spherical surface at an object side surface or an image side surface.

10. An optical lens assembly comprising a plurality of lenses arranged from an object side to an image side, the optical lens assembly comprising:
    a first lens having a negative refractive power;
    a second lens having a positive refractive power;
    a third lens having a negative refractive power;
    a fourth lens having a refractive power;
    a fifth lens having a refractive power;
    a sixth lens having a negative refractive power; and
    a stop disposed at an object side of the first lens,
    wherein the optical lens assembly satisfies the following inequalities:

$0.2 < L1ape/L6ape < 0.4$ $-1 < R3/R4 < -0.3$  <Inequalities> wherein L1ape denotes an effective radius of an object side surface of the first lens, L6ape denotes an effective radius of an image side surface of the sixth lens, R3 denotes a radius of curvature of an object side surface of the second lens, and R4 denotes a radius of curvature of an image side surface of the second lens, and $1.4 < f/EPD < 1.9$ $75 < FOV < 95$  <Inequalities> wherein EPD denotes an entrance pupil, f denotes a total focal length of the optical lens assembly, and FOV denotes a field of view of the optical lens assembly.

11. The optical lens assembly of claim 10, wherein the optical lens assembly satisfies the following inequality:

$$30 < v2 - v3 < 40 \qquad \text{<Inequality>}$$

wherein v2 denotes an Abbe number of the second lens, and v3 denotes an Abbe number of the third lens.

12. The optical lens assembly of claim 10, wherein the optical lens assembly satisfies the following inequalities:

$$0.02 < CT3/OAL < 0.06$$

$$0.08 < CT5/OAL < 0.15 \qquad \text{<Inequalities>}$$

wherein CT3 denotes a thickness of the third lens on an optical axis, OAL denotes a total length of the optical lens assembly, and CT5 denotes a thickness of the fifth lens on the optical axis.

13. An electronic apparatus comprising:
an optical lens assembly; and
an image sensor configured to receive a light ray of an image formed by the optical lens assembly,
wherein the optical lens assembly comprises a first lens having a negative refractive power, a second lens having a positive refractive power, a third lens having a negative refractive power, a fourth lens having a refractive power, a fifth lens having a refractive power, a sixth lens having a negative refractive power, and a stop disposed at an object side of the first lens, which are arranged from an object side to an image side,
wherein the optical lens assembly satisfies the following inequalities:

$$0.2 < L1ape/L6ape < 0.4$$

$$-300 < f1/f < -5 \qquad \text{<Inequalities>}$$

wherein L1ape denotes an effective radius of an object side surface of the first lens, L6ape denotes an effective radius of an image side surface of the sixth lens, f1 denotes an effective focal length of the first lens, and f denotes a total focal length of the optical lens assembly, and $$1.4 < f/EPD < 1.9$$

$$75 < FOV < 95 \qquad \text{<Inequalities>}$$

wherein EPD denotes an entrance pupil, f denotes a total focal length of the optical lens assembly, and FOV denotes a field of view of the optical lens assembly.

\* \* \* \* \*